(12) United States Patent
Graham

(10) Patent No.: US 6,467,136 B1
(45) Date of Patent: Oct. 22, 2002

(54) CONNECTOR ASSEMBLY

(76) Inventor: Neil Deryck Bray Graham, 18 Castelon Crescent, Western Australia Cockburn Waters (AU), 6166

( * ) Notice: Subject to any disclaimer, the term of this patent is extended or adjusted under 35 U.S.C. 154(b) by 0 days.

(21) Appl. No.: 09/717,973

(22) Filed: Nov. 20, 2000

Related U.S. Application Data

(63) Continuation-in-part of application No. 09/420,051, filed on Oct. 18, 1999, now Pat. No. 6,196,766, which is a continuation of application No. 08/809,852, filed on Apr. 3, 1997, now Pat. No. 5,971,667.

(30) Foreign Application Priority Data

Oct. 7, 1994 (AU) .............................................. PM8650
Oct. 6, 1995 (WO) .............................. PCT/AU95/00667

(51) Int. Cl.[7] .......................... A44B 17/00; A44B 19/36
(52) U.S. Cl. ....................... 24/591.1; 24/31 R; 24/388; 24/587; 24/590.1; 474/256
(58) Field of Search ............................... 24/591.1, 590, 24/663, 587, 31 R, 31 B, 31 C, 586.11, DIG. 50, DIG. 53, DIG. 54; 474/256; 411/549, 510

(56) References Cited

U.S. PATENT DOCUMENTS

| | | | |
|---|---|---|---|
| 1,613,193 A | * | 1/1927 | Rankin ........................... 24/591 |
| 1,704,579 A | * | 3/1929 | Sanford ......................... 24/591 |
| 3,120,107 A | | 2/1964 | Juusela et al. |
| 3,422,631 A | | 1/1969 | Silverman |
| 3,517,702 A | * | 6/1970 | Mueller et al. ................ 24/590 |
| 3,546,890 A | | 12/1970 | Ede |
| 3,777,586 A | * | 12/1973 | Stirton ......................... 24/31 R |
| 3,808,649 A | * | 5/1974 | Ausnit ........................... 24/587 |
| 3,812,884 A | | 5/1974 | Breitfuss |
| 4,057,115 A | | 11/1977 | Blanz |
| 4,058,022 A | * | 11/1977 | Pickburn ...................... 474/256 |
| 4,116,011 A | | 9/1978 | Girault |
| 4,191,493 A | | 3/1980 | Hansson et al. |
| 4,232,430 A | * | 11/1980 | Friedberg ....................... 24/388 |
| 4,819,309 A | * | 4/1989 | Behymer ....................... 24/576 |
| 4,850,440 A | | 7/1989 | Smet |
| 4,915,541 A | | 4/1990 | Thompson et al. |
| 5,076,729 A | | 12/1991 | Grotenhofer |
| 5,129,761 A | | 7/1992 | Andersen et al. |
| 5,169,264 A | | 12/1992 | Kimura |
| 5,187,843 A | | 2/1993 | Lynch |
| 5,293,672 A | | 3/1994 | Tominaga et al. |

FOREIGN PATENT DOCUMENTS

| | | | | |
|---|---|---|---|---|
| AU | 27521/77 | | 2/1979 | |
| AU | 536027 | | 8/1981 | |
| AU | 569579 | | 12/1987 | |
| DE | 0182689 | * | 7/1955 | ................... 24/587 |
| DE | 2656045 | * | 6/1978 | ................... 24/587 |

(List continued on next page.)

*Primary Examiner*—Victor Sakran
(74) *Attorney, Agent, or Firm*—Hogan & Hartson LLP

(57) ABSTRACT

A connector assembly (61) comprising a male connector element (61a) having a locking shank (101) and a female connector element (61b) having a locking cavity (133) with an external opening. The locking shank (101) is receivable in the locking cavity (133) through the external opening. The male connector element (61a) presents a male contact face (111) and the female connector element (61b) presents a female contact face (123), the male and female connector elements (61a, 61b) being configured for interaction therebetween with the contact faces (111, 123) in abutting engagement when the locking shank (101) is received in the locking cavity to resist a separating force applied between the male and female connector elements. The interaction between the male and female connector elements (61a, 61b) is provided at spaced apart locations lengthwise along the shank.

34 Claims, 35 Drawing Sheets

FOREIGN PATENT DOCUMENTS

| | | | |
|---|---|---|---|
| DE | 40 37074 A1 | | 5/1992 |
| EP | 0305834 | | 3/1989 |
| FR | 2624 199 A1 | | 6/1989 |
| GB | 0799146 | * | 8/1958 ................. 24/587 |
| GB | 1370244 | | 10/1974 |
| GB | 2 252 581 | | 8/1992 |
| JP | 4-330199 | | 11/1992 |
| JP | 6-17599 | | 1/1994 |
| JP | 6-240996 | | 8/1994 |
| NL | 75/06591 | | 6/1975 |
| SU | 794116 | | 1/1981 |
| SU | 802466 | | 2/1981 |
| SU | 1366606 A1 | | 1/1988 |

\* cited by examiner

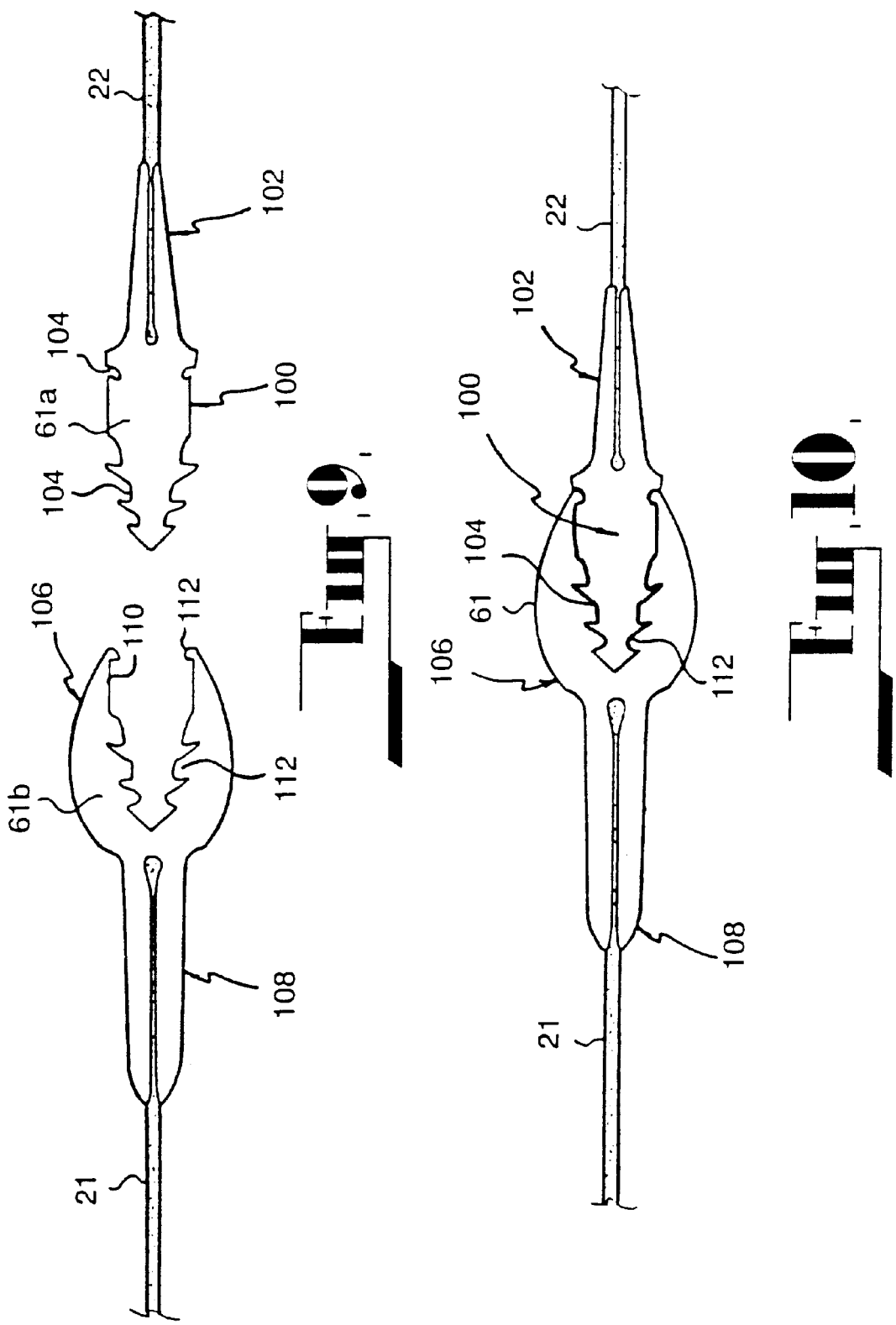

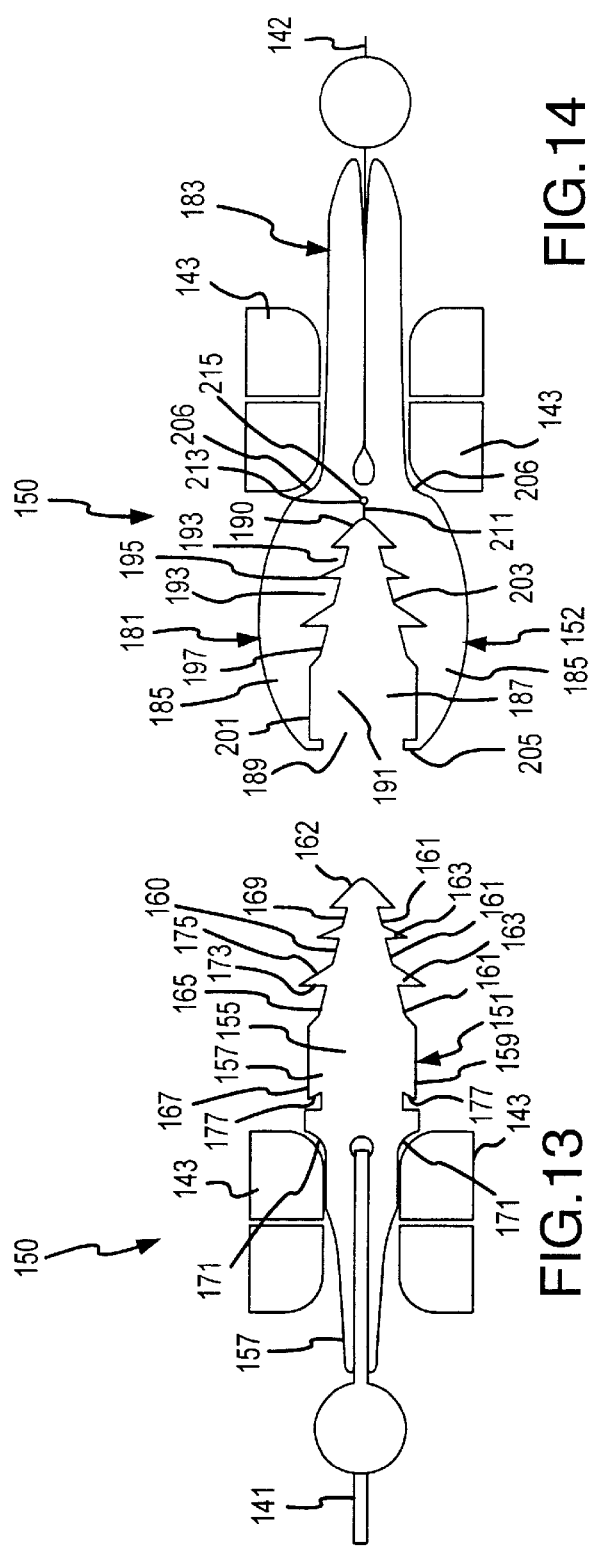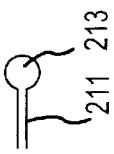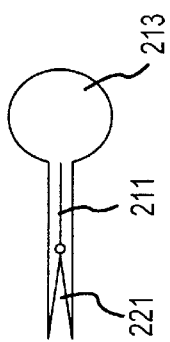

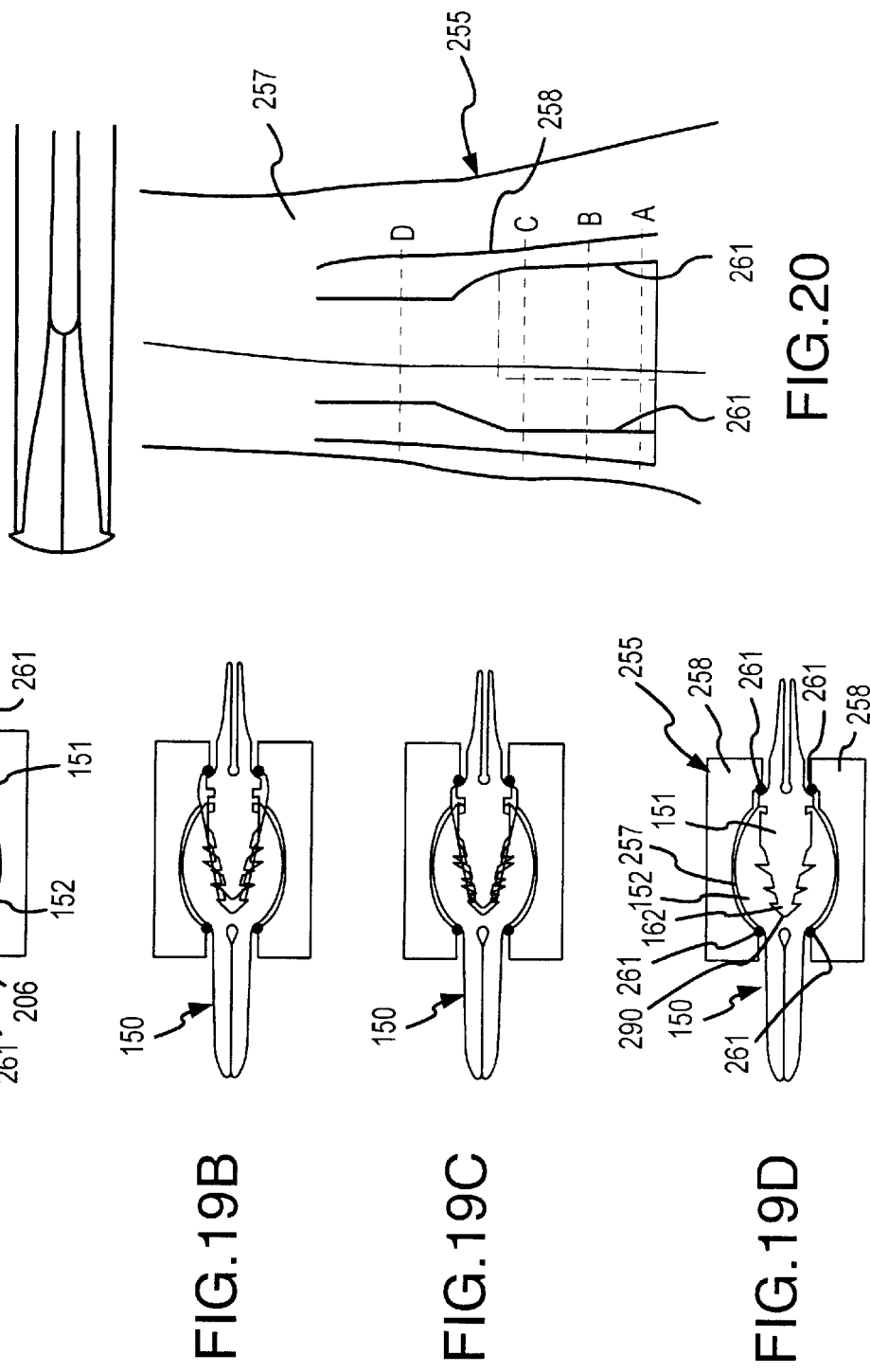

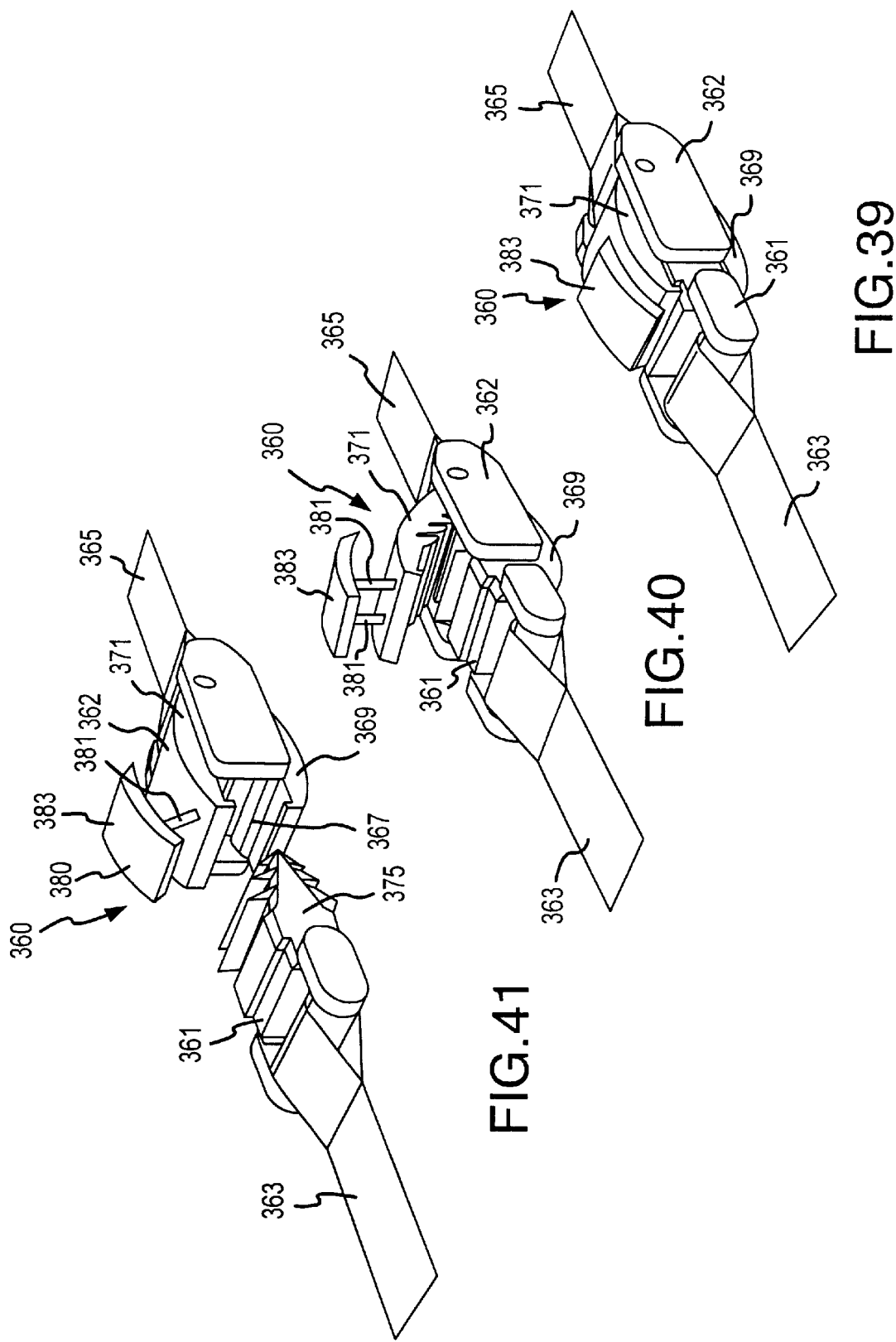

CONNECTOR ASSEMBLY

RELATED APPLICATIONS

The present application is a continuation-in-part of co-pending U.S. patent application Ser. No. 09/420,051, filed Oct. 18, 1999, now U.S. Pat. No. 6,196,766, which is a continuation of U.S. patent application Ser. No. 08/809,852 filed Apr. 3, 1997, now U.S. Pat. No. 5,971,667, claiming priority of Australia application No. PM8650 filed Oct. 7, 1994, through PCT/AU95/00667, filed Oct. 6, 1995.

FIELD OF THE INVENTION

This invention relates to a connector assembly for releasably connecting two portions. The two portions to be releasably connected together may be parts of a single object or portions of two separate objects.

BACKGROUND OF THE INVENTION

There have been a variety of proposals for connector assemblies for releasably connecting two portions together. Typically, the connector assemblies comprise a female connector element comprising a locking cavity defined within a locking jaw structure having two opposed locking teeth inwardly directed with respect to a locking cavity, and a male connector element having a head of barb shape in cross-section, the arrangement being that the head of the male connector element is receivable within the locking cavity of the female connector element with the wings of the barb in locking engagement with the locking teeth of the jaw structure. In this way, the barbed head is seated within the locking cavity and withdrawal is resisted by the jaw structure. A separating force applied between the male and female connector elements is resisted by the barbs of the head locking against the locking teeth of the jaw structure. Typical examples of such connector assemblies are disclosed in U.S. Pat. No. 5,187,843 (Lynch), U.S. Pat. No. 5,293,672 (Tominoga et al), U.S. Pat. No. 3,808,649 (Ausnit), U.S. Pat. No. 3,806,998 (Laguenne) and U.S. Pat. No. 3,347,298 (Ausnit et al). The ability of such connector assemblies to transfer loads between the male and female connector elements depends entirely on the strength of the barbs and locking teeth.

Where the connector assembly is in the form of a sliding fastener which provides lengthwise assembly, there is a need for the connector elements to have some longitudinal flexibility. The need for longitudinal flexibility can adversely impact on the strength of the barbs and locking teeth, and hence on the ability of the connector assembly to resist a separating force applied thereto.

It is against this background that the present invention has been developed.

SUMMARY OF THE INVENTION

The present invention provides a connector assembly comprising a male connector element having a locking shank and a female connector element having a locking cavity with an external opening, the locking shank being receivable in the locking shank through the external opening, the male connector element presenting a male contact face and the female connector element presenting a female contact face, the male and female connector element being configured for interaction therebetween with the contact faces in abutting engagement when the locking shank is received in the locking recess to resist a separating force applied between the male and female connector elements, said interaction between the male and female connector elements being provided at spaced apart locations lengthwise along the shank.

Preferably, the interaction between the male and female connector elements is provided by a series of complementary ridges and recesses at spaced intervals along the contact faces.

The ridges may be provided on the female connector element and the complementary recesses may be provided in the male connector element.

The recesses may be separated by a plurality of spaced locking ribs projecting from the respective contact face. Each locking rib may present a locking face facing away from the free end of the shank and disposed at an acute angle with respect to the contact face.

The ridges may be separated by locking grooves of complementary configuration to the locking ribs.

One of the connector elements has a first engagement means for engagement with a second engagement means on the other connector element whereby the application of the separating force between the two connector elements urges one of the two contact faces towards the other contact face thereby to enhance interaction between the connector elements.

Preferably, the first and second engagement means are adapted to provide pivotal engagement between the connector elements.

The first engagement means may comprise a tooth formation and the second engagement means may comprise a tooth recess configured to pivotally receive the tooth formation.

Preferably, the contact faces each have at least a section thereof disposed with respect to the line of action of the separating force.

The locking cavity within the female connector element may comprise a locking channel and two contact faces, one disposed on each longitudinal side of the channel. The complementary locking shank presenting two contact faces, one each longitudinal side of the elongate shank.

Such an arrangement is particularly suitable where the connector assembly is adapted for connecting two longitudinal edge portions together lengthwise.

In another arrangement, the male connector may comprise a spigot presenting an outer circumferential contact face and the female connector element may comprise a socket for receiving the spigot and presenting an inner circumferential contact face. Such an arrangement is particularly suitable where the connector assembly is adapted for connecting two end portions together in end-to-end relation.

Preferably, the locking cavity is adapted to expand to receive the locking shank and to contract upon the locking shank received therein.

The locking cavity may be defined between two jaw sections movable relative to each other for expanding and contracting the locking cavity.

Conveniently the jaw sections are biased towards a closed condition corresponding to contraction of the cavity.

The female connector element may be formed of resiliently deformable material whereby the jaw sections are biased towards the closed condition by virtue of the resiliently deformable nature of the female connector element.

In another arrangement, the jaw sections may be pivotally connected with respect to each other and a biasing means provided for biasing the jaws towards the closed condition.

In still another arrangement, the jaw sections may be pivotally connected with respect to each other and a retaining means provided for retaining the jaws in the closed condition.

The male and female connector elements may each be of elongate form and longitudinally flexible. In such a case, the fastener assembly may further comprise a slider for moving the connector elements into and out of interaction with each other.

The slider may be provided with means for progressively expanding the locking channel as the slider moves with respect to the female connector element to facilitate admission of the shank of the male connector element into the locking channel.

The expanded portion of the locking channel can subsequently contract to engulf the portion of the shank received therein as the slider proceeds along the female connector element. The expanded portion of the locking channel can contract either under the influence of the resiliently deformable nature of the female connector element, or under the influence of the slider, or under both influences.

The present invention also provides a connector assembly comprising two connector elements each having a contact face adapted for abutting engagement with the contact face of the other, the connector elements being configured for interaction therebetween when the contact faces are in abutting engagement to resist a separating force applied between the two connector elements, one of the connector elements having a first engagement means for engagement with a second engagement means on the other connector element whereby the application of a separating force between the two connector elements urges one of the two contact faces towards the other contact face thereby to enhance interaction between the connector elements.

Preferably, the first and second engagement means are adapted to provide pivotal engagement between the connector elements.

The first engagement means may comprise a tooth formation and the second engagement means may comprise a tooth recess configured to pivotally receive the tooth formation.

Preferably, the contact faces each have at least a section thereof disposed obliquely with respect to the line of action of the separating force.

While in most applicators it is likely that each connector element would have only a first engagement means or a second engagement means, there are certain applications where each connector element has both first and second engagement means. In such applications, the first engagement means may be provided adjacent one end of the contact face and the second engagement means provided adjacent an opposed end of the contact face.

One of the connector elements may comprise a male connector element and the other connector element may comprise a complementary female connector element.

Each connector element is preferably elongate and extends along one longitudinal side of an elongate section of flexible material. The first connector element may be provided in a male configuration with the second connector element provided in a complementary female configuration.

The first and second connector elements may further have complementary longitudinal ridges and recesses provided thereon and arranged such that force applied to pull same apart acts to strengthen the grip of the second connector element about the first connector element.

The invention also provides a connector assembly for releasably connecting together two elongate edge sections, the connector means comprising first and second connector elements of complementary configuration, said first connector element being adapted for attachment to one of the two elongate edge sections and having an opening in opposed relation to said one of the two elongate edge sections, a channel portion having a pair of opposed sides in spaced apart relationship and extending inwardly from said opening to define a locking cavity, the opposed sides having opposed inner faces confronting the locking cavity, containing a first engaging means and converging towards the other of the opposed sides in a direction away from the opening, said second connector element being adapted for attachment to the other of the two elongate edge sections and including a head portion adapted to be received in the locking cavity of the channel portion of the first connector element, the head portion having opposed side faces converging towards each other in a direction away from the other elongate edge section, each face being provided with a second engaging means, whereby the second engaging means engages with the first engaging means when the head portion is received within the cavity and releasable secures the second connector element to the first connector element, whereby such may be pressed together and force applied to pull such apart acts to strengthen the group therebetween, with the connector elements requiring an unpeeling or unzipping action to separate same.

The invention also provides a connector assembly for releasably connecting together two elongate edge sections, the connector means comprising first and second elongate connector elements of complementary configuration, said first connector element being adapted for attachment to one of the two elongate edge sections and having two jaw sections defining an opening in opposed relation to said one of the two elongate edge sections and a channel portion having a pair of opposed sides in spaced apart relationship and extending inwardly from said opening to define a locking cavity, the opposed sides having opposed inner faces confronting the locking cavity, containing a first engaging means and converging towards the other of the opposed sides in a direction away from the opening, said second connector element being adapted for attachment to the other of the two elongate edge sections and including a head portion adapted to be received in the locking cavity of the channel portion of the first connector element, the head portion having opposed side faces converging towards each other in a direction away from the other elongate edge section, each face being provided with a second engaging means, the free end of each jaw section being adapted to pivotally engage with the head portion when the latter is received in the locking cavity the second engaging means engaging with the first engaging means when the head portion is received within the locking cavity and releasable secures the second connector element to the first connector element, whereby such may be progressively pressed together along the length thereof and force applied to pull such apart acts to strengthen the group therebetween, with the connector elements requiring an unpeeling or unzipping action to separate same.

Preferably, a formation is provided adjacent the free end of each jaw section for engaging with a complementary formation on the head to provide said pivotal engagement between the jaw section and the head. The formation on the jaw section may comprise a tooth formation and the complementary formation on the head may comprise a recess to receive the tooth formation.

Typically, inter-engagement between each tooth formation and the corresponding tooth recess provides a pivot about which the respective jaw sections can pivot under the influence of a separating force applied to the connector elements so as to urge the jaw sections inwardly. This enhances the interlocking action.

The invention also provides a connector assembly for releasably connecting together two elongate edge sections, the connector means comprising first and second connector elements of complementary configuration, said first connector element being adapted for attachment to one of the longitudinal edges and the second connector element being adapted for attachment to the other of the longitudinal edges, the first connector element comprising a body having two jaw sections defining an opening in opposed relation to said one longitudinal edge and a channel portion extending inwardly from said opening to define a locking cavity, the channel portion having a pair of opposed sides in spaced apart relationship, the opposed sides having opposed inner faces confronting the locking cavity, each opposed side containing a first engaging means and converging towards the other of the opposed sides in a direction away from the opening to terminate at one end of a slit extending into the body in the direction away from the opening, a hinge being provided at the other end of the slot to facilitate movement of the two jaw sections towards and away from each other, said second connector element comprising a head portion adapted to be received in the locking cavity of the channel portion of the first connector element, the head portion having opposed side faces converging towards each in a direction away from the other longitudinal edge, each face being provided with a second engaging means, whereby the second engaging means engages with the first engaging means when the head portion is received within the recess and releasably secures the second connector element to the first connector element, whereby such may be pressed together and force applied to pull such apart acts to strengthen the grip therebetween, with the connector elements requiring an unpeeling or unzipping action to separate same. Preferably, the slot terminates at a hole.

The invention is particularly suitable for connecting two longitudinal edge portions together lengthwise in the manner of a zipper. In such a case, the longitudinal edge portions may be two opposed marginal edges of a flexible sheet, with the connector assembly providing a way of connecting the two marginal edges together.

The invention is not, however, limited to connecting longitudinal edge portions together. The invention may, for example, be used to connect end portions together. In such a case, the end portions may be the ends of an elongate element such as a belt, cable, rope or the like, with the connector assembly providing a way of connecting the ends of the elongate elements together in the manner of a clasp such as a buckle.

BRIEF DESCRIPTION OF THE DRAWINGS

The invention will be better understood by reference to the following description of several specific embodiment thereof as shown in the accompanying drawings in which:

FIG. 9 is a schematic view illustrating connection means according to the embodiment employed for forming the shroud, the connector assembly being shown in a separated (open) condition;

FIG. 10 is a view similar to FIG. 9 with the exception that the connector assembly is shown in a connected (closed) condition;

FIG. 13 illustrates a male connector element forming part of a connector assembly according to a second embodiment;

FIG. 14 is a view similar to FIG. 13 with the exception that a female connector element is shown;

FIG. 15 is an exploded view illustrating part of the female connector element of FIG. 14;

FIG. 18 is also an exploded view illustrating part of the female connector element illustrated in FIG. 15 but showing an optional sealing diaphragm;

FIGS. 19a to 19d illustrate a connector assembly according to a further embodiment, showing various stages during which the male and female connector elements are connected together;

FIG. 20 is a schematic view of parts of a slider forming part of the connector means shown in FIGS. 19a to 19d for zipping and unzipping the male and female connector elements;

FIG. 39 is a schematic perspective view of a connector assembly according to a still further embodiment in the form of a buckle shown in a connected condition;

FIG. 40 is a view similar to FIG. 39 with the exception that the buckle is shown in a condition in which it is about to be released;

FIG. 41 is also a view similar to FIG. 39 with the exception that the buckle is shown in a released condition;

DETAILED DESCRIPTION

The first embodiment shown in FIGS. 1 to 12 of the drawings is directed to a connector assembly 61 employed in mining apparatus 10 for use in an underground mining operation for recovering materials from underground formations which are normally extremely difficult to access, such as deep leads covered by an overburden of mud, sand and basalt.

Figure 1:
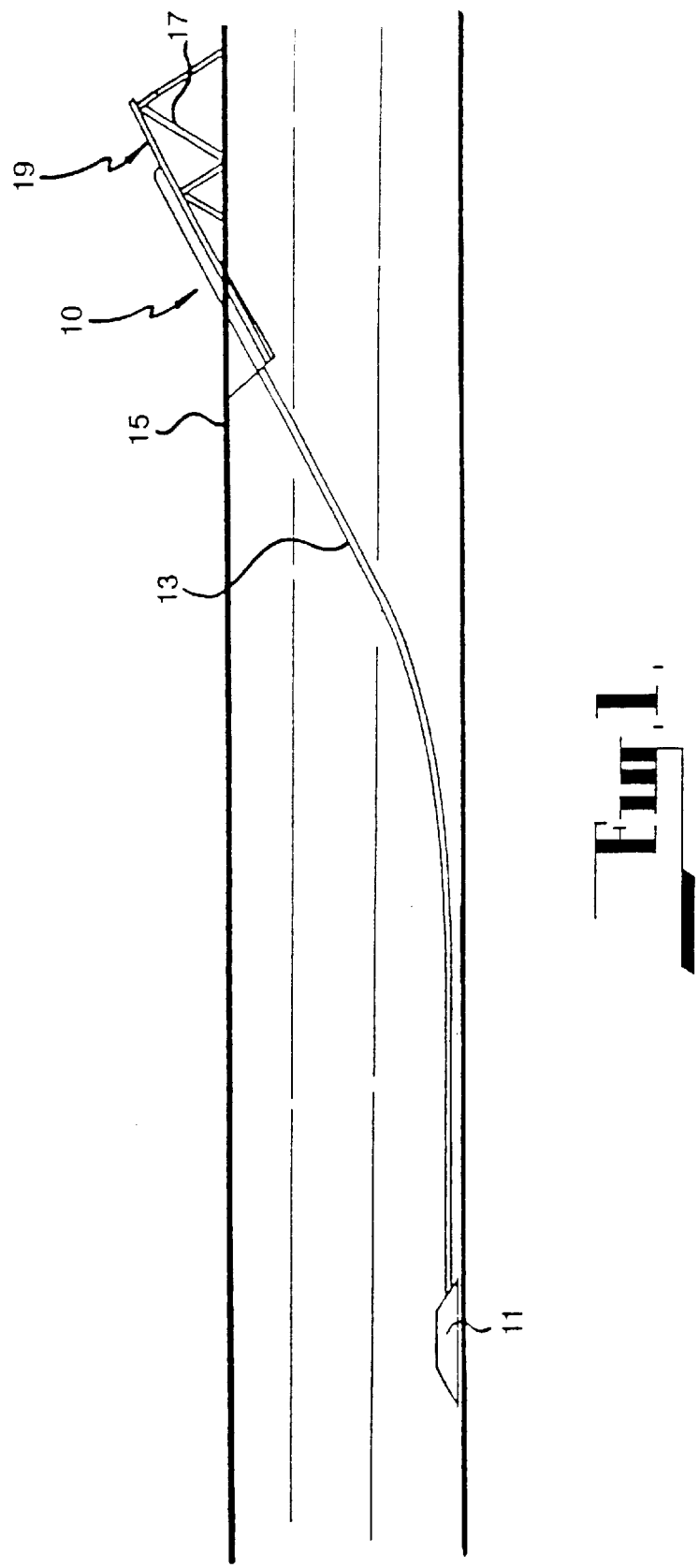
FIG. 1 is a schematic side view illustrating an underground mining operation utilising apparatus which includes a connector assembly according to a first embodiment.

The mining apparatus 10 is generally shown in FIG. 1 of the drawings and comprises a mining head 11 provided at one end of a pipe string 13. The mining head 11 is delivered to the underground formation where the mining operation is performed. The mining head 11 progressively excavates material from the underground formation and conveys the excavated material to the ground surface 15 by way of the pipe string 13. The pipe string 13 and head 11 may be manipulated to manoeuvre the mining head 11 within the underground formation. The head 11 providing the whole or part of the motive power. The path of the mining head provides an access passage 16, shown in FIG. 3, along which the pipe string 13 extends during the mining operation. The pipe string 13 extends from a structure 17 provided at a station 19 situated at ground level. The structure 17 may be erected on the ground or in a launch pit or recess within the ground.

The pipe string 13 comprises a plurality of pipe string sections which are connected one to another at the station 19 as the mining head 11 and pipe string 13 advance through the ground. Similarly, the pipe string sections are progressively dismantled at the station 19 when the pipe string 13 and mining head 11 are being retrieved from the ground.

Figure 2:
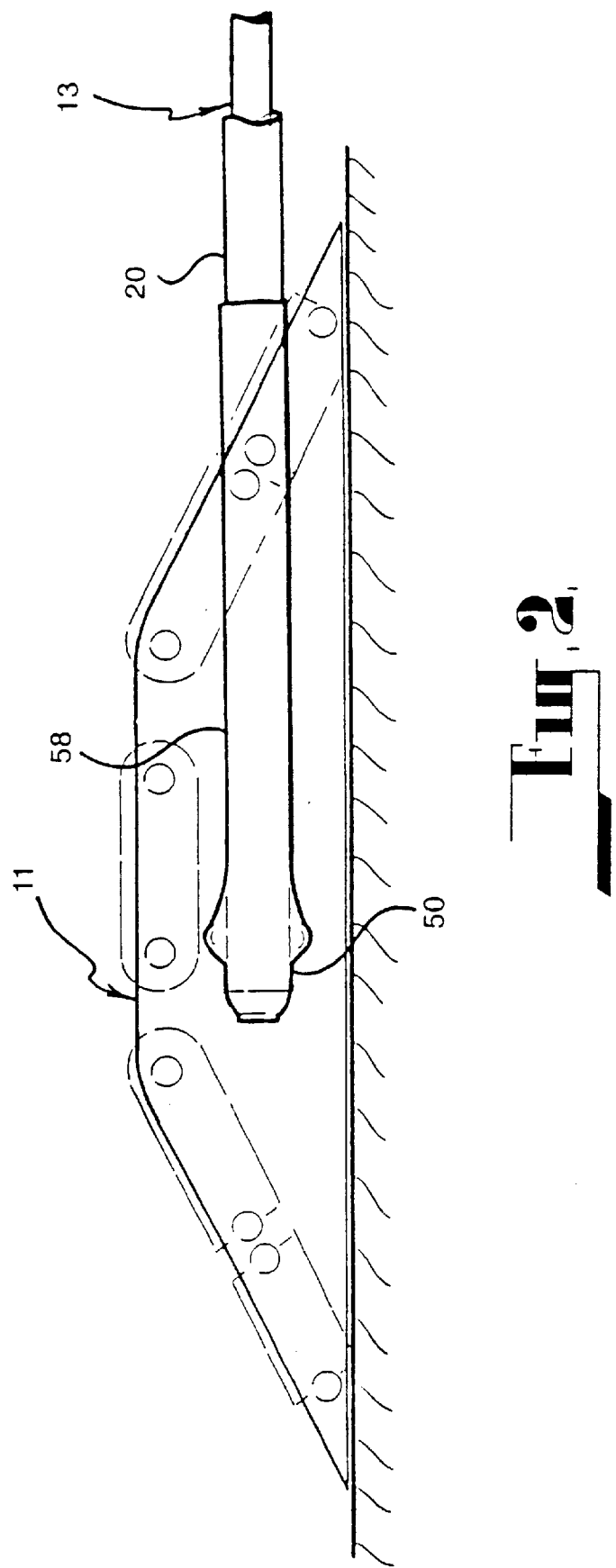
FIG. 2 is a schematic view illustrating the head end section of the apparatus and a mining head associated therewith.

The mining head 11 is delivered to the underground formation by progressively excavating material to create a path for itself and the pipe string 13 trailing behind it, as shown in FIG. 2. The difficulty with this arrangement is that the passage 16 excavated by the mining head 11 can collapse about the pipe string 13, particularly in circumstances where the surrounding material 14 is unstable, such as in soft sandy conditions.

A shroud 20 as provided about the pipe string 13 for lining the passage 16 so as to prevent the surrounding material 14 from collapsing onto the pipe string 13.

The shroud 20 is formed from flexible material delivered in two sections 21, 22 and then assembled to form the shroud around the pipe string 13. Apparatus for assembling the shroud 20 is disclosed in U.S. patent application Ser. No. 09/420,051, the contents of which are incorporated herein by way of reference. Each section 21, 22 of flexible material is stored in roll form at station 19 on the ground and is unwound from the roll as the pipe string 13 advances.

Figure 4:
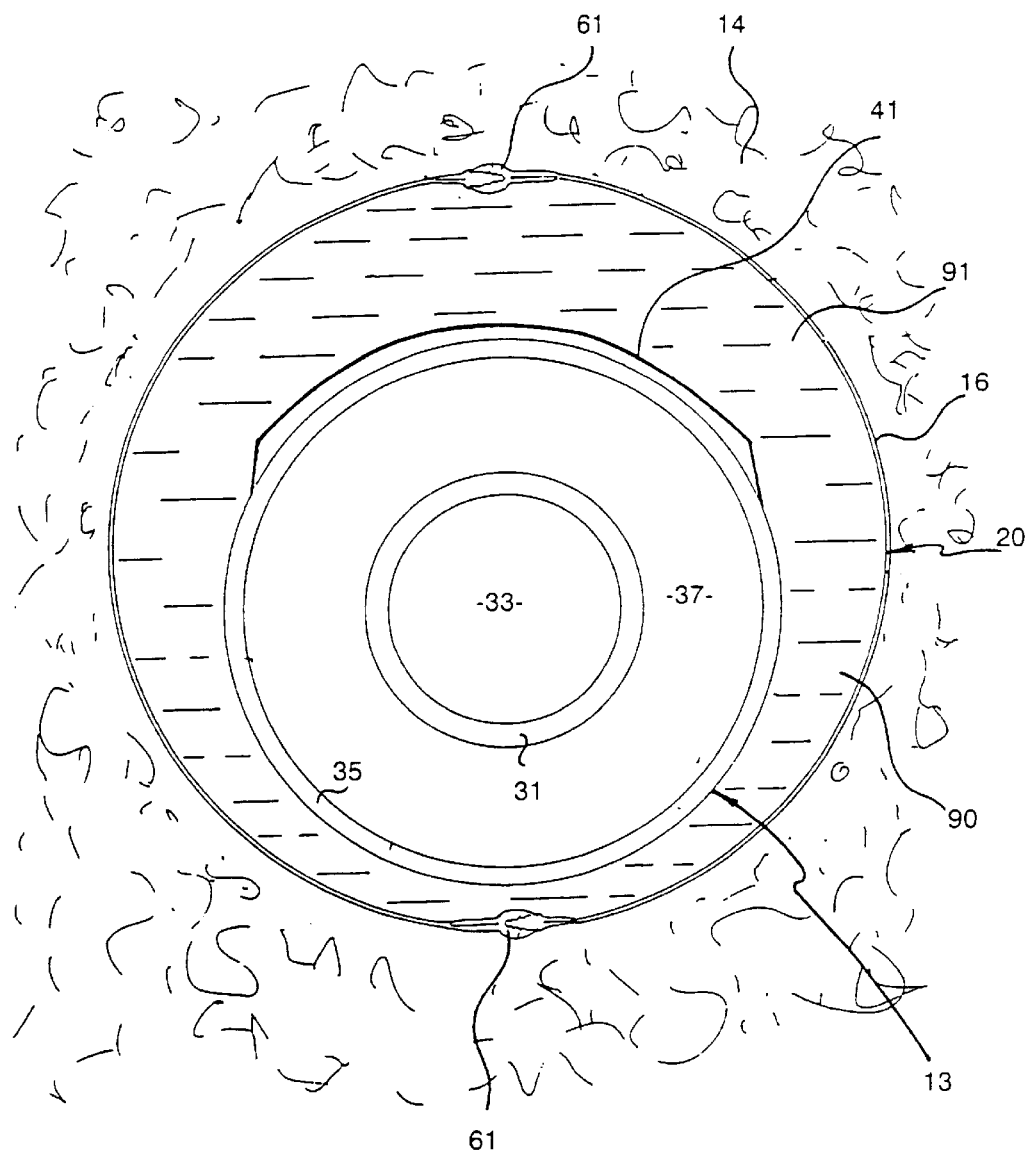
FIG. 4 is a cross-sectional view of part of the apparatus.
Figure 5:
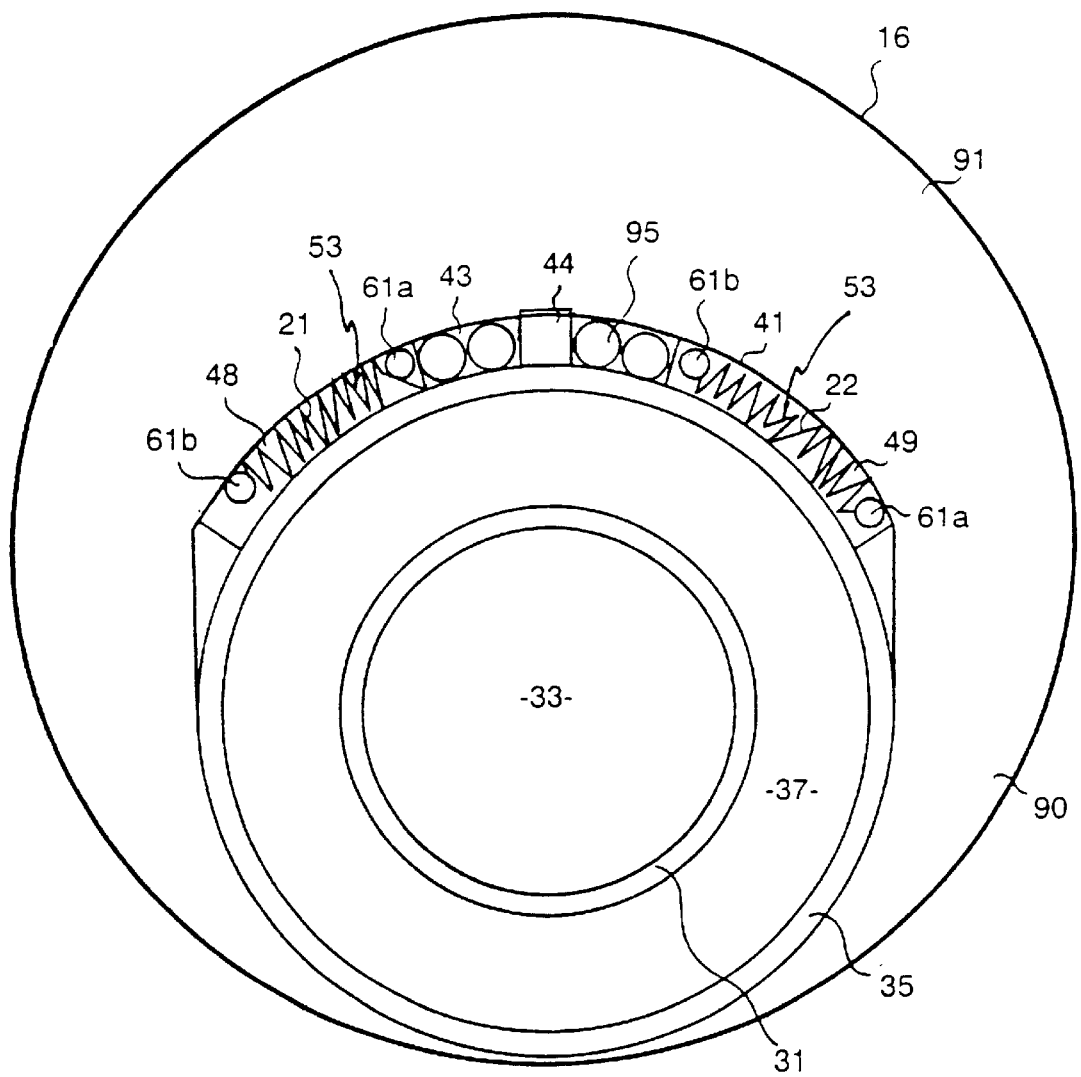
FIG. 5 is a cross-sectional view similar to FIG. 4 but showing further detail.

The pipe string 13 comprises an inner tube 31, seen in FIGS. 4 and 5, defining a central flow path 33 and an outer tube 35 positioned around, and in spaced apart relation to, the inner tube 31 such that an outer flow path 37 is defined between the inner tube 31 and the outer tube 35. The inner flow path 33 is provided to convey excavated slurry from the mining head 11 to the ground surface. The outer flow path 37 is provided to convey water under pressure from the ground surface to the mining head 11 for use in the mining operation.

The pipe string 13 further comprises a casing 41 mounted on the exterior of the outer tube 35, as is best seen in FIG. 5. The casing 41 provides a longitudinal space 43 which extends along the pipe string for accommodating service lines (such as power and telemetry cabling) which extend between the station 19 at ground surface and the mining head 11. The space 43 may also incorporate sensing means 44 to measure distance between the pipe string 13 and the shroud 20 to provide a warning of any impending collapse of the shroud.

The space 43 also incorporates two longitudinal passages 48, 49 along which the sections 21, 22 of flexible material can be conveyed in a compact condition from the station 19 to the head end section 50 of the apparatus.

Figure 6:
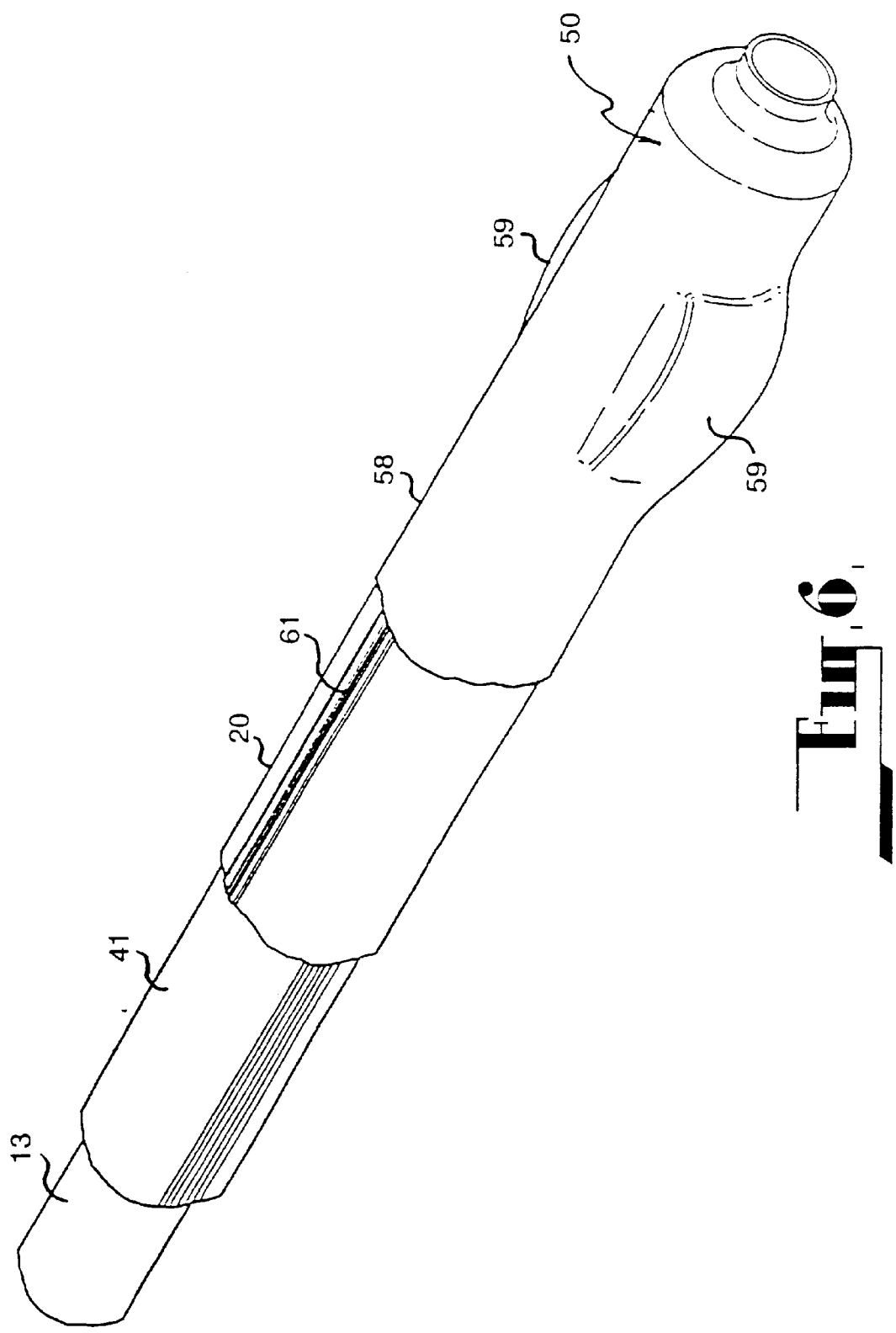
FIG. 6 is a fragmentary schematic view of the head end section of the apparatus.
Figure 7:
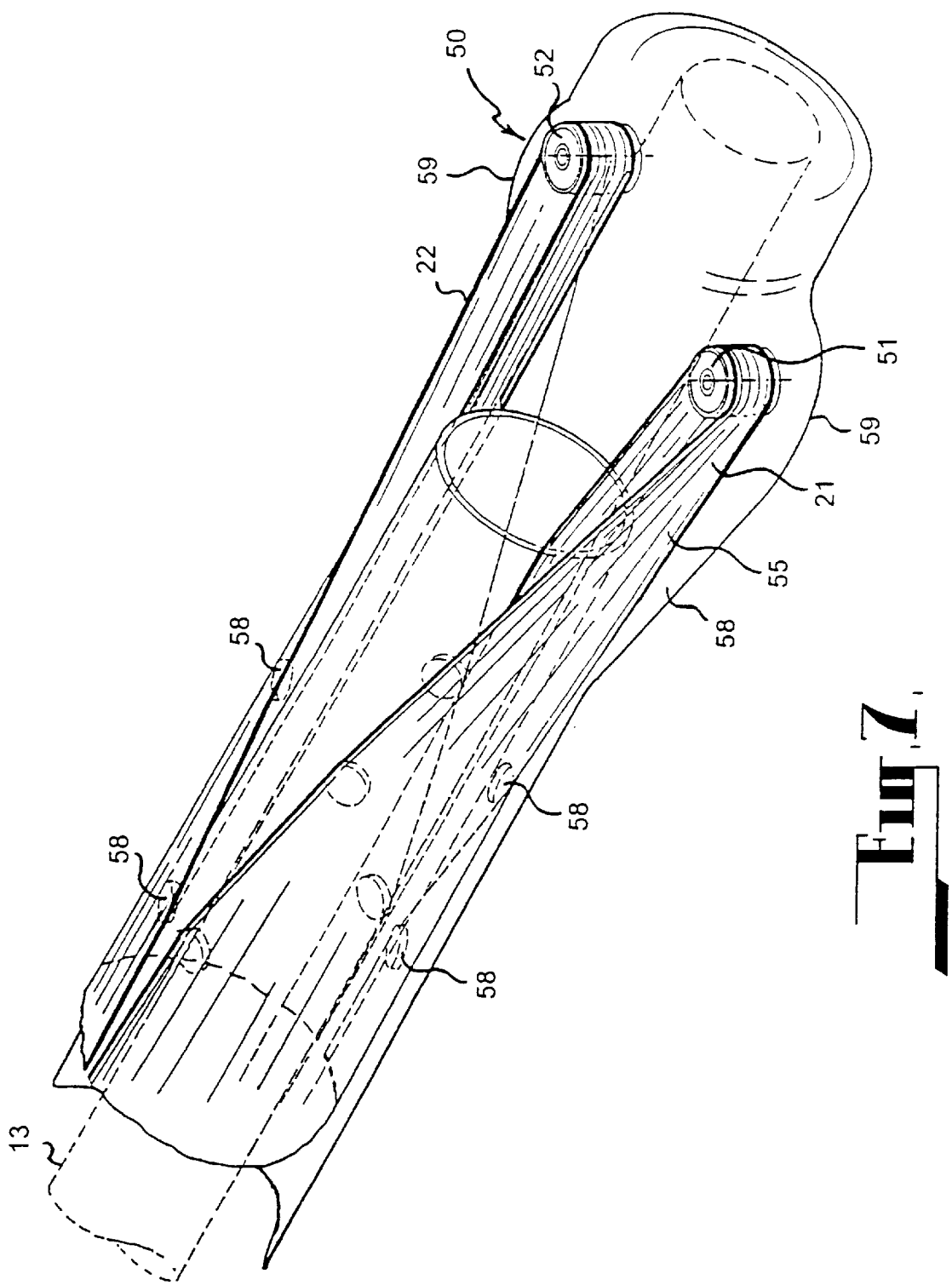
FIG. 7 is a schematic view of the head end section of the apparatus showing deployment of the shroud.
Figure 8:
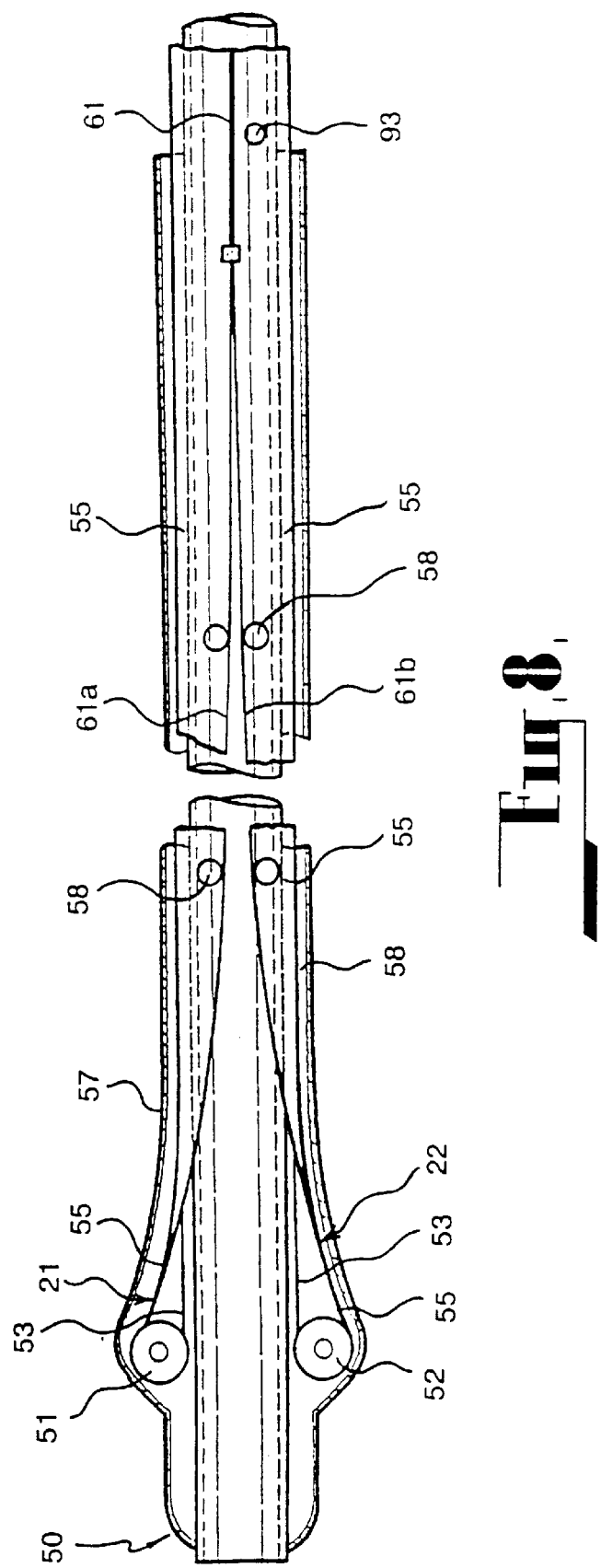
FIG. 8 is a fragmentary schematic cross-sectional view of the head end section.

At the head end section 50 of the apparatus, shown in FIGS. 6 to 8, there are provided two rollers 51, 52 one corresponding to each section 21, 22 of the flexible material. The rollers 51, 52 are so positioned that the flexible material which is drawn along the longitudinal passages 48, 49 in a compact condition each turns about itself on the respective roller to provide an inner section 53 and an outer section 55. The outer sections 55 emerging from the longitudinal passages 48, 49 spread from the compact condition and are subsequently brought together in a manner to be described later to form the shroud 20.

The rollers 51, 52 are accommodated in a casing 57 which surrounds the head end section 50. The casing 57 is in spaced apart relationship with the pipe string 13 whereby an annular space 58 is defined therebetween. The casing 57 incorporates protuberances 59 to accommodate the rollers 51 and 52, as best seen in FIG. 8 of the drawings.

The space 58 provides a path along which the outer section 55 of each section 21, 22 of the flexible material can be deployed with the longitudinal sides of the sections brought together to form the shroud 20.

Each flexible section 21, 22 has two longitudinal sides provided with the connector assembly 61, according to the embodiment.

The connector assembly 61 comprises a first connector element being a male element 61a and a second connector element being a female connector element 61b. The arrangement is such that the male connector element 61a of each flexible section is arranged for engagement with the female connector element 61b of the other flexible section in the manner of a zipper. In this way, the longitudinal sides of the two flexible sections 21, 22 can be zipped together to form the shroud, as best seen in FIG. 4. The longitudinal sections of the two sections 21, 22 are progressively brought towards each other and then subsequently zipped together by way of guide roller assemblies 58 positioned along the casing 57.

The male connector element 61a comprises a head portion 100 and a trail portion 102. The trail portion 102 is affixed to the longitudinal side of the flexible section 22.

The head portion 100 comprises a shank 101 having a straight section 103 and an inwardly tapered section 105 terminating at a nose 107 at the outer end of the head portion 101 opposite to the tail portion 102.

A series of recesses 104 are provided on the head portion 100. The recesses 104 are separated by, and in effect defined by, a plurality of spaced locking ribs 109 provided on the tapered section 105 of the shank 101.

With this arrangement, the shank 101 defines two opposed contact faces 111 from which the ribs 109 project. Each contact face 111 has a straight section 113 defined by the straight shank section 103 and an inwardly tapered section 115 defined by the tapered shank section 105.

The head portion 100 further comprises two shoulders 116, each between one of the contact faces 111 and the tail portion 102.

Each locking rib 109 presents locking face 117 which faces away from the nose 107 and which is disposed at an acute angle to the adjacent contact face 111, and a further face 119 which is disposed at an obtuse angle to the adjacent contact face 111.

A tooth recess 121 is provided in the straight section 113 of each contact face 111, adjacent the respective shoulder 116.

The female connector element 61b comprises a channel portion 106 and a tail portion 108. The tail portion 108 is affixed to the longitudinal side of the flexible section 21.

The channel portion 106 comprises two locking jaw sections 131 between which a locking channel 133 is defined. The locking channel 133 provides a locking cavity. The locking channel 133 extends inwardly from a channel opening 135 defined between the free ends of the jaws 131 to a base 137.

The channel portion 106 has provided on an inner surface 110 thereof a series of ridges 112 complementary to the recesses 104 of the male connector element 61a. The ridges 112 are separated by locking grooves 122 of complementary configuration to the locking ribs 109.

With this arrangement, the channel portion 106 defines two opposed contact faces 123 onto which the locking grooves 122 open. Each contact face 123 has a straight section 125 and a tapered section 127 which respectively abut with the straight section 113 and tapered section 115 of one of the contact faces 111 of the male contactor element 61b when the male and female connector elements are connected together, as will be explained later.

Adjacent the free end of each locking jaw section 131 there is provided a tooth formation 141 adapted for location in the corresponding tooth recess 121 in the male connector element 61a.

The channel portion 106 further comprises two shoulders 132, each between one of the jaw sections 131 and the tail portion 108.

In assembling the connector assembly 61, the male connector element 61a is progressively presented to the female connector element 61b. The shank 101 of the male connector element 61a enters the female connector element 61b through the channel opening 135. The jaw sections 131 yieldingly spread outwardly owing to their resilient nature in order to accept the shank 101. The outward spreading of the jaw sections 131 can be achieved in any appropriate way, such as by provision of a slider or by the action of the shank 101 being urged into the locking channel 133. Once the shank 101 is fully received in the channel 133, the jaw sections 131 close so as to engulf the shank 101 and effect inter-engagement between the male and female connector elements 61a, 61b, as illustrated in FIG. 10. In this condition, the ridges 112 and recesses 104, and thus the locking ribs 109 and locking grooves 122, are interlocked. Additionally, the tooth formations 141 are located in their corresponding tooth recesses 121. Furthermore, the respective contact faces 111, 123 are in abutting engagement.

Inter-engagement between each tooth formation 141 and the corresponding tooth recess 121 provides a pivot about which the respective jaw sections 131 can pivot under the influence of a separating force applied to the connector elements 61a, 61b, so as to urge the jaw sections 131 inwardly. This has the effect of urging the ridges 112 and recesses 104, and thus the locking ribs 109 and locking grooves 122, into engagement.

When a separating force is exerted on the male and female connector elements 61a, 61b, the load is spread between the various ridges 112 and recesses 104, and thus between the various locking ribs 109 and locking grooves 122. Because of the inclined nature of the tapered contact face sections 115, 127, loading applied between the various ridges 112 and recesses 104, and thus between the various locking ribs 109 and locking grooves 122, is spread laterally with respect to the line of action of the separating force. This load spreading considerably enhances the loading strength of the connector assembly.

It is envisaged that means be provided to ensure that the connector assembly 61 is firmly fastened before it is released from the head 11. These means can cover electrical, magnetic and visual means for checking before release.

A lower seal (not shown) is provided between the outer periphery of the pipe string 13 and the inner periphery of the shroud 20 at a location adjacent the region in the head section 50 at which assembly of the two sections 21, 22 is completed to form the shroud. The inner seal can be a complex of inflating and flexible seals which in turn can be used to pressure test the shroud 20 and connector means 61 before release from the elongate element. The lower seal is fixed in relation to the pipe string 13 so as to advance and withdraw with the pipe string, and slidingly engages the outer section 55.

Figure 3:
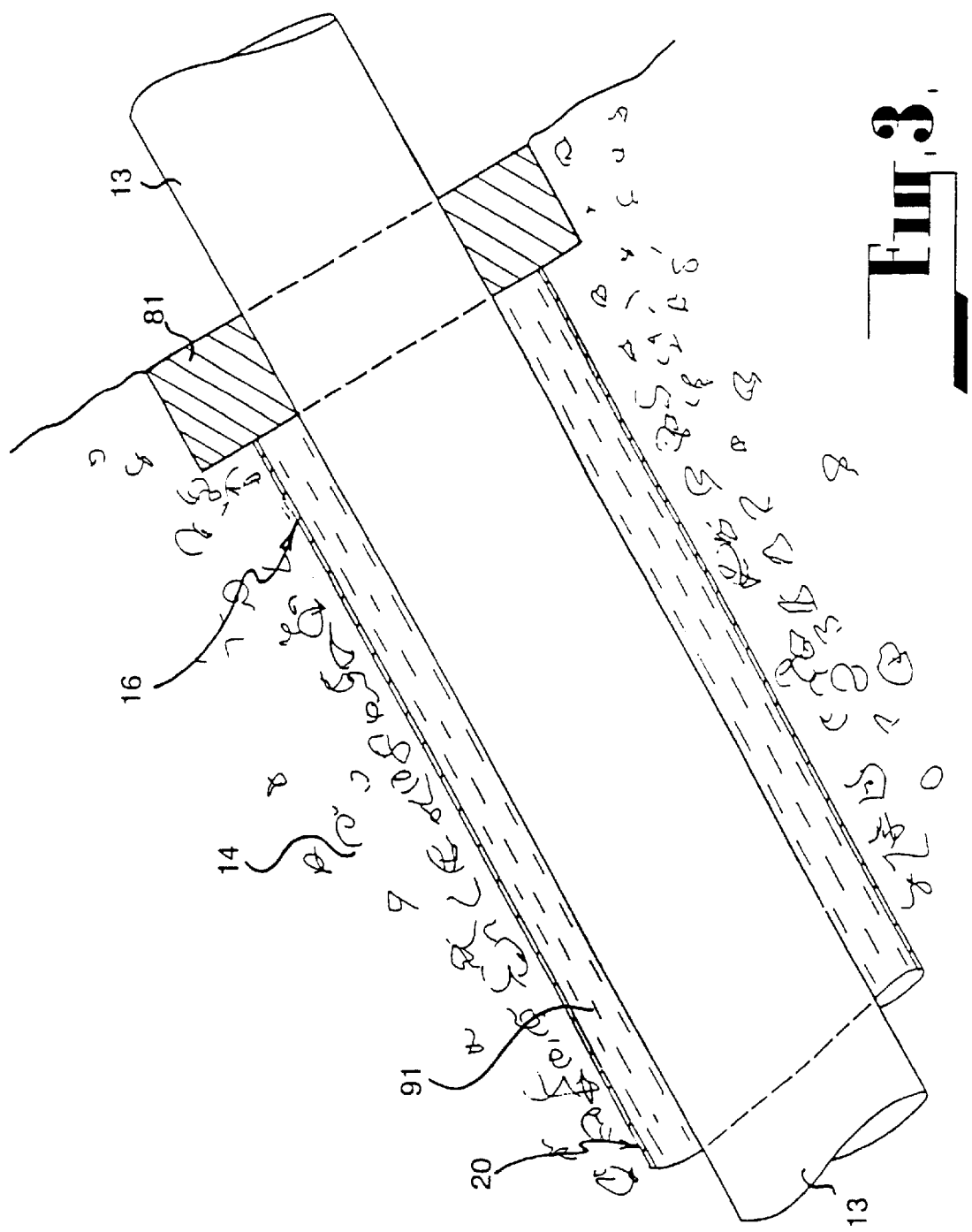
FIG. 3 is a schematic view of a tail end section of the apparatus.

Similarly, an upper seal 81 is provided adjacent ground level or at the water table between the shroud 20 and the pipe string 13, as shown in FIG. 3. The upper seal 81 is arranged to permit sliding movement of the pipe string therethrough as it advances along the passage 16.

The inner and upper seals define a sealed zone 90 within the shroud 20 which provides an inflation chamber 91, seen best in FIGS. 4 and 5. An inflation fluid such as Bentonite slurry is introduced into the inflation chamber 91 for the purposes of inflating the shroud 20 and urging it into engagement against the periphery of the passage 16 around the pipe string 13. In this way, the shroud 20 provides support for the material 14 adjacent the periphery of the passage 16 for the purposes of preventing collapsing of the passage around the pipe string. The inflation fluid is introduced into the inflation chamber through inlet port 93 which communicates with a delivery line 95 accommodated within the casing 41 on the pipe string 13. The delivery line extends to the station 19 at ground level to receive the inflation fluid.

In operation, the apparatus according to the embodiment progressively deploys the shield 20 which supports the passage 16 formed by the mining head 11 as it advances through the ground. The shroud 20 is continually deployed as the pipe string 13 advances, the sections 21, 22 of flexible material being drawn along the longitudinal passages 48 in the casing 41 on the pipe string, and then being turned about themselves on the rollers 51, 52 and subsequently brought together to form the shroud in the manner described. With this arrangement, the shroud 20 is progressively deployed at the head end section 50, the outer section 51 of the shroud being stationary with respect to the passage 16 once it has been deployed to form the shroud.

At the completion of the mining operation, the pipe string 13 and mining head 11 can be retracted along the passage 16. During retraction of the pipe string and mining head, the sections 21, 22 of flexible material are also retracted and returned to the rolls on which they are stored. During the retraction process, the connecting elements 61 unzip with respect to each other and the sections 21, 22 are drawn into and along the longitudinal passages 48 within the casing 41.

A cleaning means (not shown) may be provided for performing a cleaning operation on the sections 21, 22 of flexible material before they are returned to the roll form. The cleaning means may comprise sprays from which a cleaning fluid such as water is sprayed onto the sections.

Figure 11:
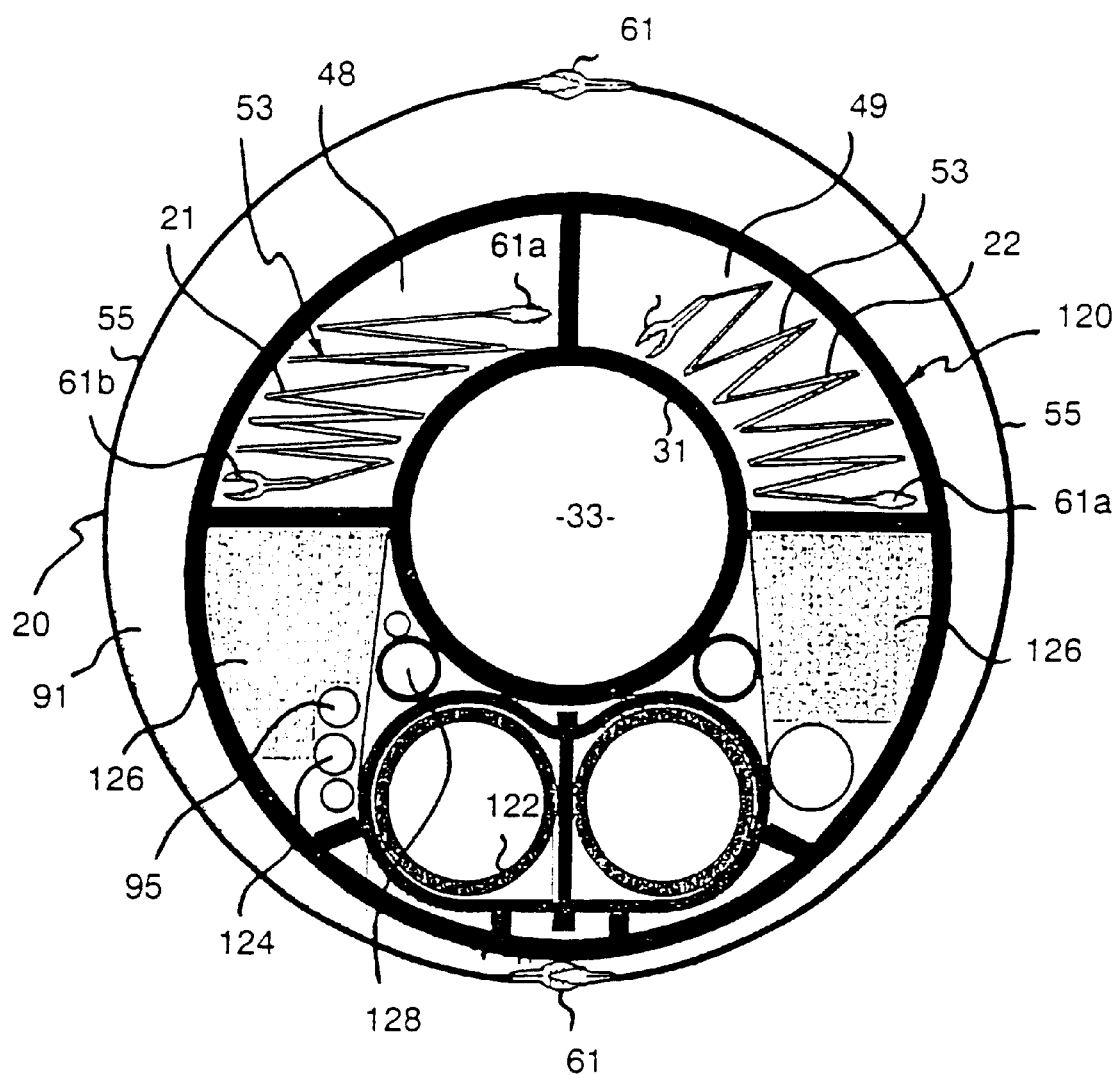
FIG. 11 is a cross-sectional view of a pipe string and longitudinal sections of an alternative apparatus within a deployed outer section of flexible material.

In FIG. 11 there is shown an alternative arrangement in which there is a pipe string 120 of substantially circular in cross-section in which is provided the inner tube 31 defining the central flow path 33.

The pipe string 120 further carries two water lines 122 replacing the outer tube 35 of the first embodiment and the variously required service lines for power and telemetry cabling, shown generally at 124. Still further, flotation or buoyancy material 126 may be provided therein so as to buoy the pipe string 120 within the inflation chamber 91.

The longitudinal passages 48, 49 are provided within the pipe string 120 and such may also have the sections 21, 22 of flexible material conveyed therethrough in a compact condition. Connector means 61 are provided to releasably connect the sections together to assemble the shroud. A delivery line 128 for cleaning water is shown within the pipe string 120, the cleaning water being utilised to clean the sections 21, 22 of the flexible material before they are returned to the roll form.

Figure 12:
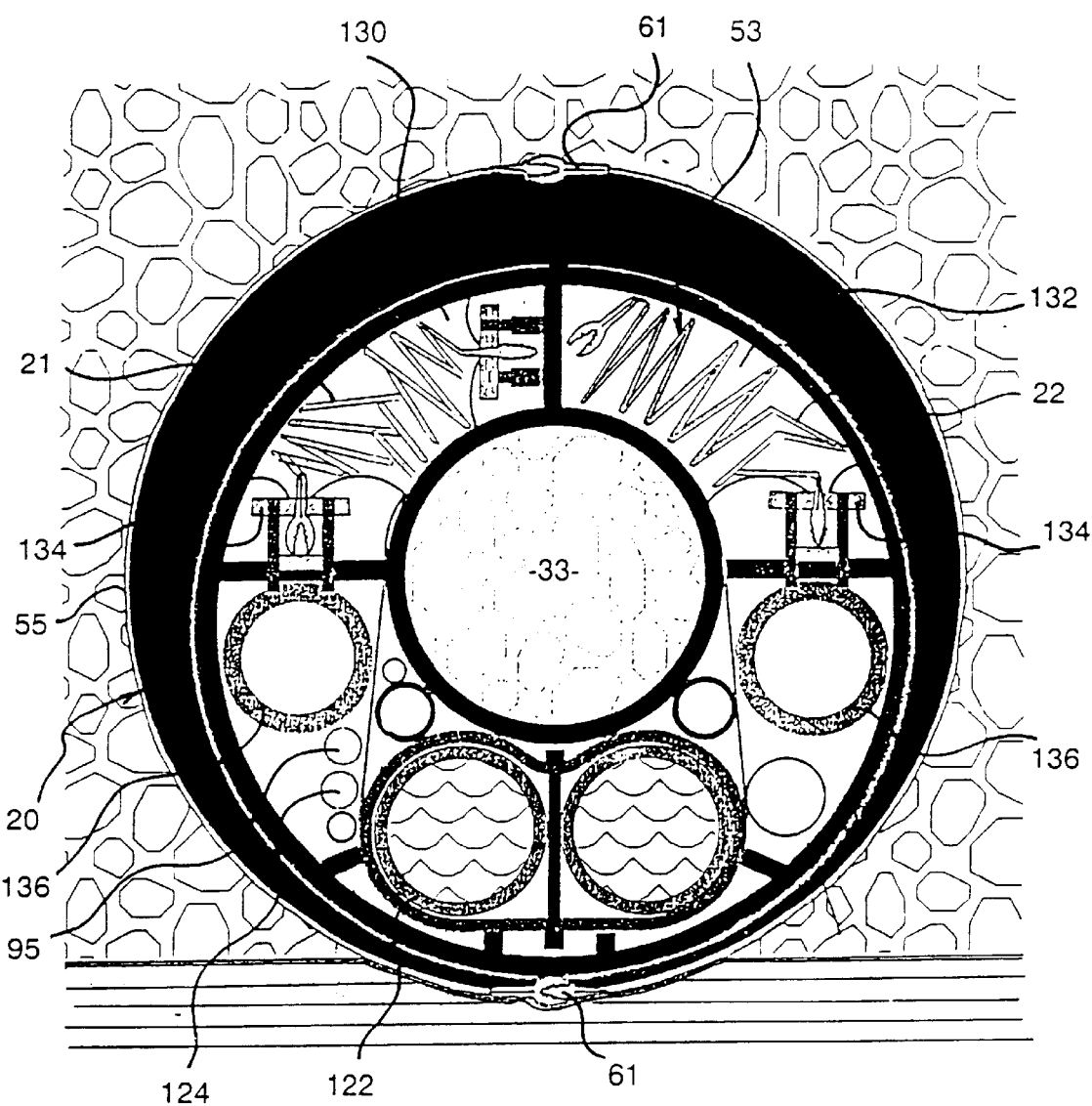
FIG. 12 is a view similar to that of FIG. 11 with the exception that driving means are provided in the longitudinal passages to facilitate deployment of the flexible material.
Figure 16:
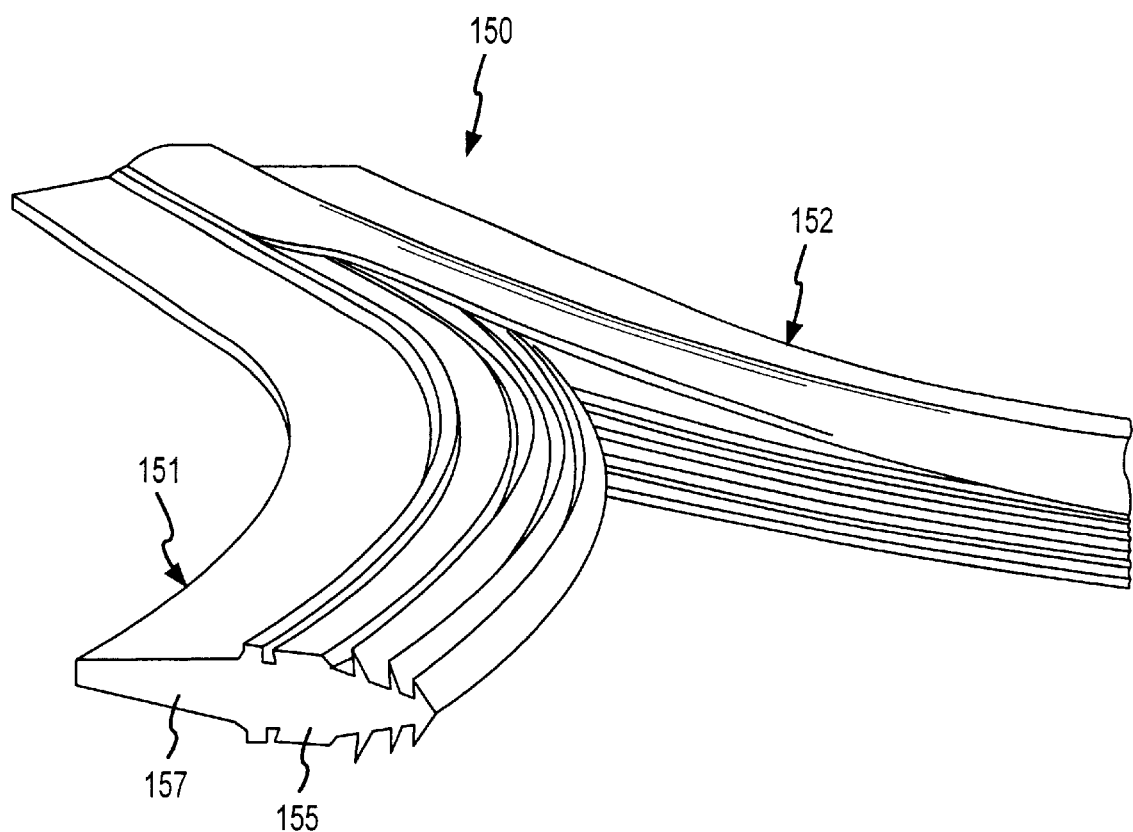
FIG. 16 is a schematic perspective view illustrating the connector assembly according to the second embodiment moving into a closed condition, illustrating the male connector element in the foreground.
Figure 17:
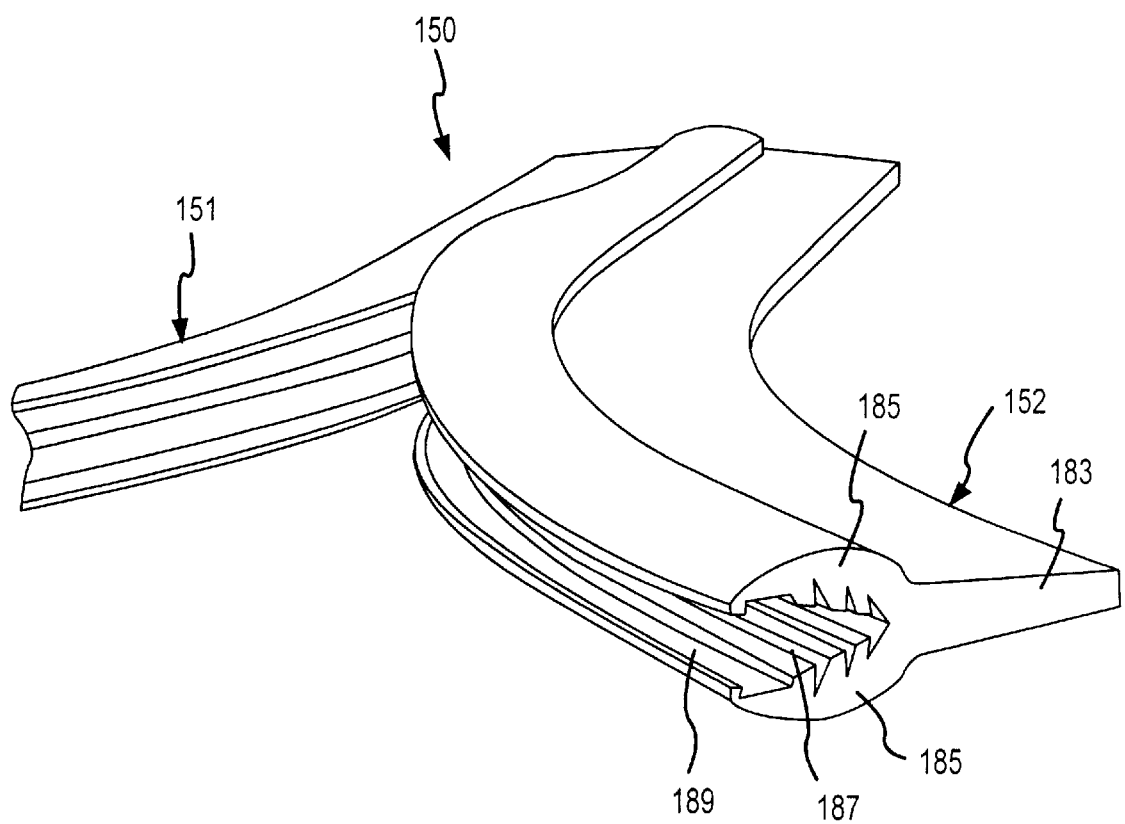
FIG. 17 is a view similar to FIG. 16 with the exception that the female connector element is illustrated in the foreground.

In FIG. 12 there is shown a modification of the pipe string 120 in which longitudinal passages 130, 132 have the sections 21, 22 of flexible material provided with driving means comprising conveyor roller pairs 134 and power means 136 associated therewith. The roller pairs 134 receive therein the connector elements 61a or 61b and facilitate the travel of the inner section 53 of the flexible material within the passages 130, 132. Such is advantageous when the flexible material is to be conveyed within the pipe string 120 over long distances.

Referring now to FIGS. 13 to 17, there is shown a connector assembly 150 according to a second embodiment for connecting together two longitudinal sections 141, 142. The connector assembly 150 comprises a first connector element in the form of a male element 151 and a second connector element in the form of a female connector element 152. The arrangement is such that the male connector element 151 is arranged for engagement with the female connector element in the manner of a zipper. The male and female connector elements 151, 152 are guided into zipping engagement with each other by rollers 143. In this way, the longitudinal edges of the two longitudinal sections 141, 142 can be zipped together.

The connector assembly 150 provides a continuous and watertight connection between the two longitudinal sections 141, 142.

The male connector element 151 comprises a head portion 155 and a trail portion 157. The trail portion 157 is affixed to a longitudinal edge of the respective longitudinal section 141.

The head portion 155 comprises a shank 157 having a straight section 159 and an inwardly tapered section 160 terminating at a nose 162 at the outer end of the head portion 155 opposite to the tail portion 157.

A series of recesses 161 are provided on the head portion 155. The recesses 161 are separated by, and in effect defined by, a plurality of spaced locking ribs 163 provided on the tapered section 160 of the shank 157.

With this arrangement, the shank 157 defines two opposed contact faces 165 from which the locking ribs 163 project. Each contact face 165 has a straight section 167 defined by the straight shank section 159 and an inwardly tapered section 169 defined by the, tapered shank section 160.

The head portion 155 further comprises two shoulders 171, each between one of the contact faces 165 and the tail portion 157.

Each locking rib 163 presents locking face 173 which faces away from the nose 162 and which is disposed at an acute angle to the adjacent contact face 165, and a further face 175 which is disposed at an obtuse angle to the adjacent contact face.

A tooth recess 177 is provided in the straight section 159 of each contact face 165 adjacent the respective shoulder 171.

The female connector element 152 comprises a channel portion 181 and a tail portion 183. The tail portion 183 is affixed to the longitudinal side of the flexible section 142.

The channel portion 181 comprises two locking jaw sections 185 between which a locking channel 187 is defined. The locking channel 187 extends inwardly from a channel opening 189 defined between the free ends of the jaw sections 185 to a base 190.

The channel portion 181 has opposed inner surfaces 191 on which are formed a series of ridges 193 complementary to the recesses 161 of the male connector element 151. The ridges 193 are separated by locking grooves 195 of complementary configuration to the locking ribs 163.

With this arrangement, the channel portion 181 defines two opposed contact faces 197 onto which the locking grooves 195 open. Each contact face 197 has a straight section 201 and a tapered section 203 which respectively abut with the straight section 167 and tapered section 169 of one of the contact faces 165 of the male contactor element 151 when the male and female connector elements 151, 152 are connected together.

Adjacent the free ends of each locking jaw section 185 there is provided a tooth formation 205 adapted for location in the corresponding tooth recess 177 in the male connector element 151.

The channel portion 181 further comprises two shoulders 206, each between one of the jaw sections 185 and the tail portion 183.

In assembly the connector assembly 150 the male connector element 151 is progressively presented to the female connector element 152. The shank 157 of the male connector element 151 enters the female connector element 152 through the channel opening 189. The jaw sections 185 yieldingly spread outwardly owing to their resilient nature in order to accept the shank 157. The outward spreading of the jaw sections 185 can be achieved in any appropriate way, such as by provision of a slider or by the action of the shank 157 being urged into the locking channel 187. Once the shank 157 is fully received in the channel 187, the jaw sections 185 close so as to engulf the shank 157 and effect inter-engagement between the male and female connector elements 151, 152. In this condition, the ridges 193 and recesses 161 and locking grooves 195 are interlocked. Additionally, the tooth formations 205 are located in their corresponding tooth recesses 177. Furthermore, the respective contact faces 164, 197 are in abutting engagement.

Inter-engagement between each tooth formation 205 and the corresponding tooth recess 177 provides a pivot about which the respective jaw sections 185 can pivot under the influence of a separating force applied to the connector elements 151, 152 so as to urge the jaw sections inwardly. This has the effect of urging the ridges 193 and recesses 161, and thus the locking ribs 163 and locking grooves 195, into engagement.

When a separating force is exerted on the male and female connector elements 151, 152, the load is spread between the various ridges 193 and recesses 161, and thus between the various locking ribs 163 and locking grooves 195. Because of the inclined nature of the tapered contact face sections 169, 203, loading applied between the various ridges 193 and recesses 161, and thus between the various locking ribs 163 and locking grooves 195, is spread laterally with respect to the line of action of the separating force. This load spreading considerably enhances the loading strength of the connector assembly 150.

The inner surfaces 191 of the channel portion 181 converge towards each other in a direction away from the channel opening 189 to terminate at one end of a slit 211 extending into the channel portion 181 in the direction away from the channel opening 189. The other end of the slit 211 terminates at a hole 213 which defines a hinge 215 between the two jaw sections 185 to facilitate movement of the two jaw sections towards and away from each other.

In a variation shown in FIG. 18, the slit 211 may incorporate a sealing diaphragm 221 against which the nose 162 of the male connector element 51 may sealingly engage.

Referring now to FIGS. 19*a* to 19*d*, there is shown a connector assembly 150 comprising a first connector element in the form of a male element 151 and a second connector element in the form of a female connector element 152. The male and female connector elements 151, 152 are adapted to be pressed together in a zipping action and separated in a peeling or unzipping action under the influence of a slider 255. The male and female connector elements 151, 152 are of a similar construction to the corresponding elements in the embodiment shown in FIGS. 13 to 17, and corresponding reference numerals are used to identify corresponding parts and features.

The slider 255 incorporates a path 257 along which the male and female connector elements 151, 152 are zipped together or unzipped (as the case may be) according to the direction of movement of the slider. The slider 255 incorporates a pair of opposed plates 258, 259 in spaced apart relationship through which the male and female connector elements 151, 152 pass for part of their movement along the guide path 257.

The guide plates 258, 259 incorporate guides 261 which locate against shoulders 171, 206 provided on the male and female connector elements 151, 152 for progressively urging the male and female connector elements 151, 152 into engagement. As can be seen in the sequence illustrated between FIG. 19*a* and FIG. 19*d*, the male connector element 251 is progressively moved into engagement with the female connector element 253 by the guides 261 acting on the respective shoulders 171, 206 of the connector elements.

A particular feature of the connector assembly 150 is that opening or unzipping of the interconnected male and female connector elements 151, 152 is initiated by fuel urging the two elements 151, 152 inwardly towards each other such that the nose 162 of the male connector element 151 nudges the base 190. This causes the locking jaw sections 185 to spread, so releasing engagement with shank 157. The shank 157 can then be withdrawn from the locking channel 187.

The action of first urging the two connector elements 151, 152 inwardly towards each other to initiate the opening or unzipping phase is performed by the slider 255 through interaction between the guides 261 and the respective shoulders 171, 206 on the connector elements 151, 152.

Figure 21:
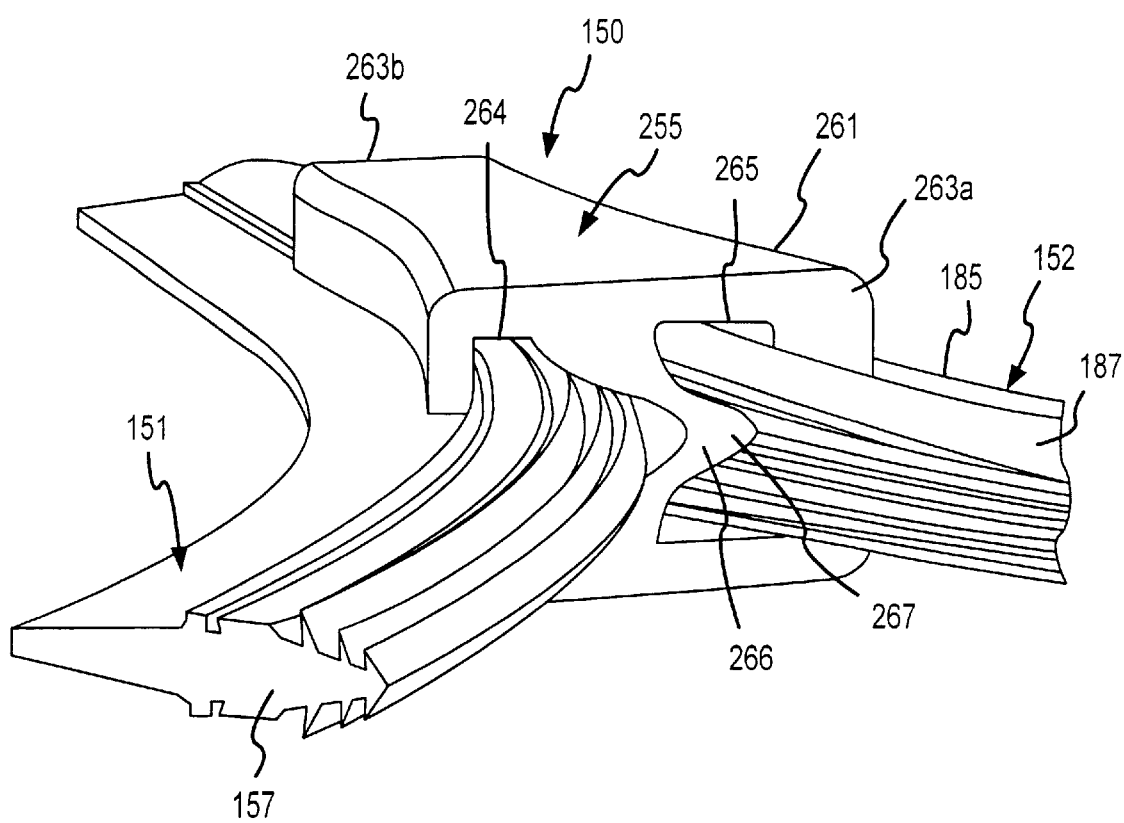
FIG. 21 is a schematic perspective view of a connector assembly according to a further embodiment, viewed from one side thereof.
Figure 22:
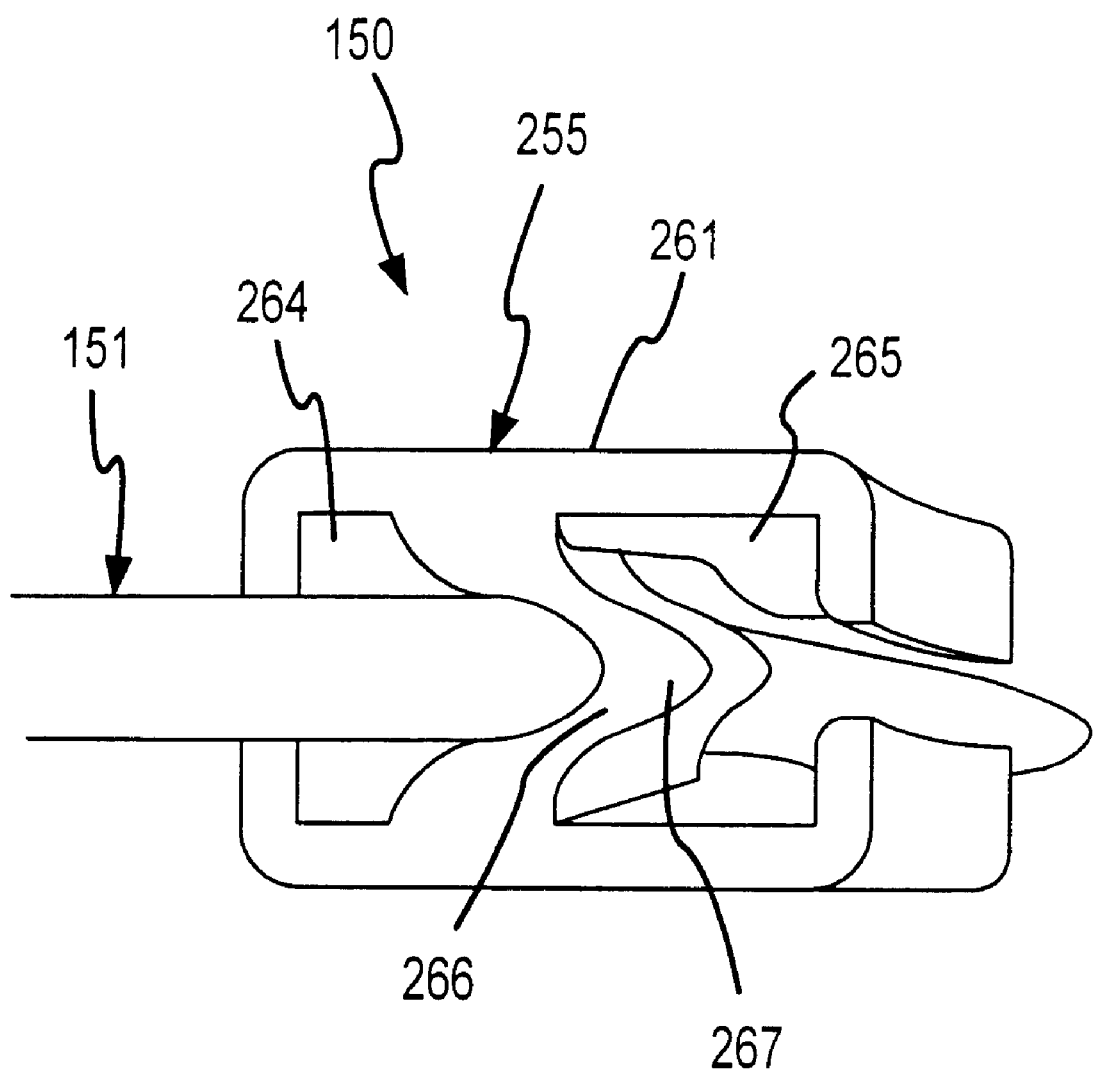
FIG. 22 is a view similar to FIG. 21 with the exception that the connector assembly is viewed from the other side thereof and the female connector element is omitted for the purposes of clarity.
Figure 23:
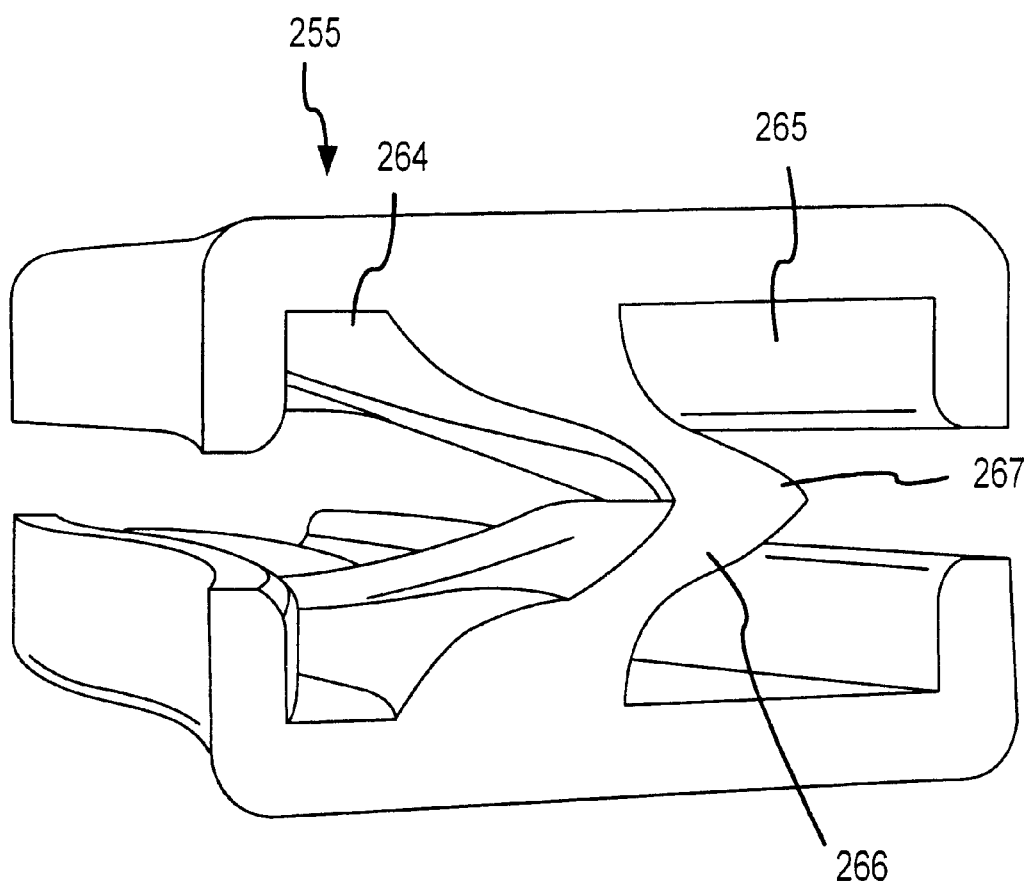
FIG. 23 is a perspective view of a slider forming part of the connector assembly of FIG. 21.
Figure 24:
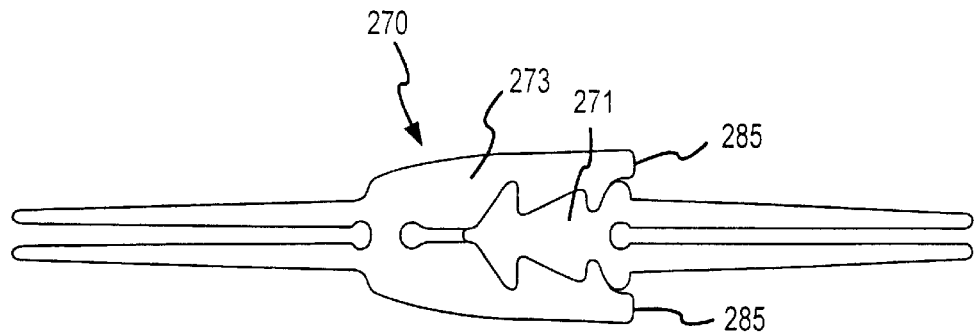
FIG. 24 is a schematic view of a connector assembly according to a further embodiment, with the male and female connector elements thereof being shown in a connected (closed) condition.
Figure 25:
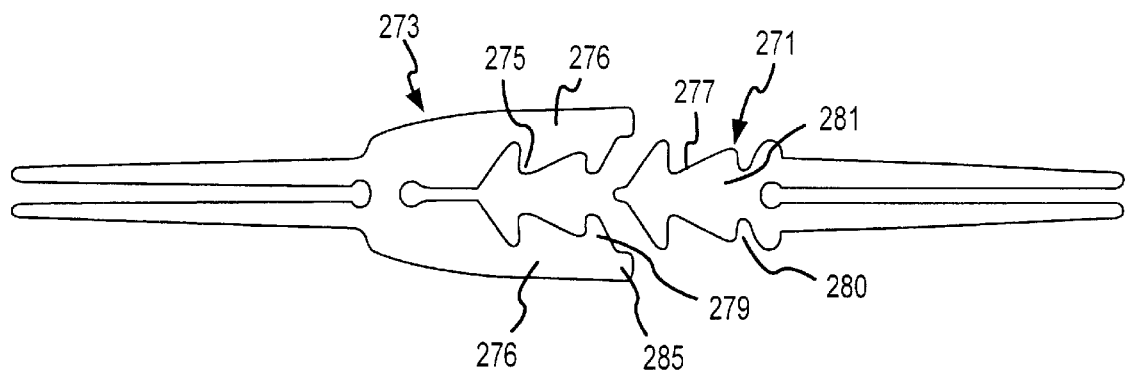
FIG. 25 is a view similar to FIG. 20 with the exception that the male and female connector elements are shown in a separated (open) condition.
Figure 26:
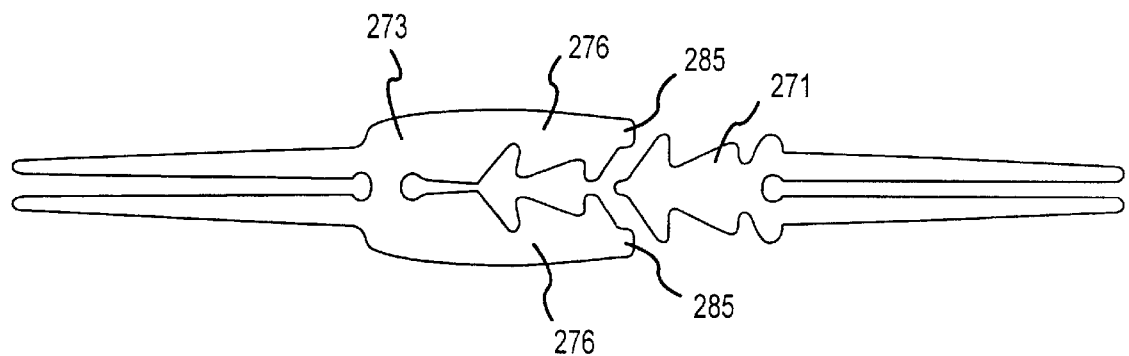
FIG. 26 is a view somewhat similar to FIG. 25 with the exception that the jaws of the female connector element are shown pressed inwardly.
Figure 27:
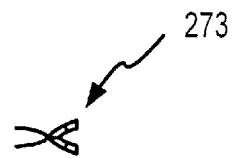
FIG. 27 is a schematic view of the female connector means of the embodiment shown in FIG. 24, with the female connector element being depicted in a typical actual size.
Figure 28:
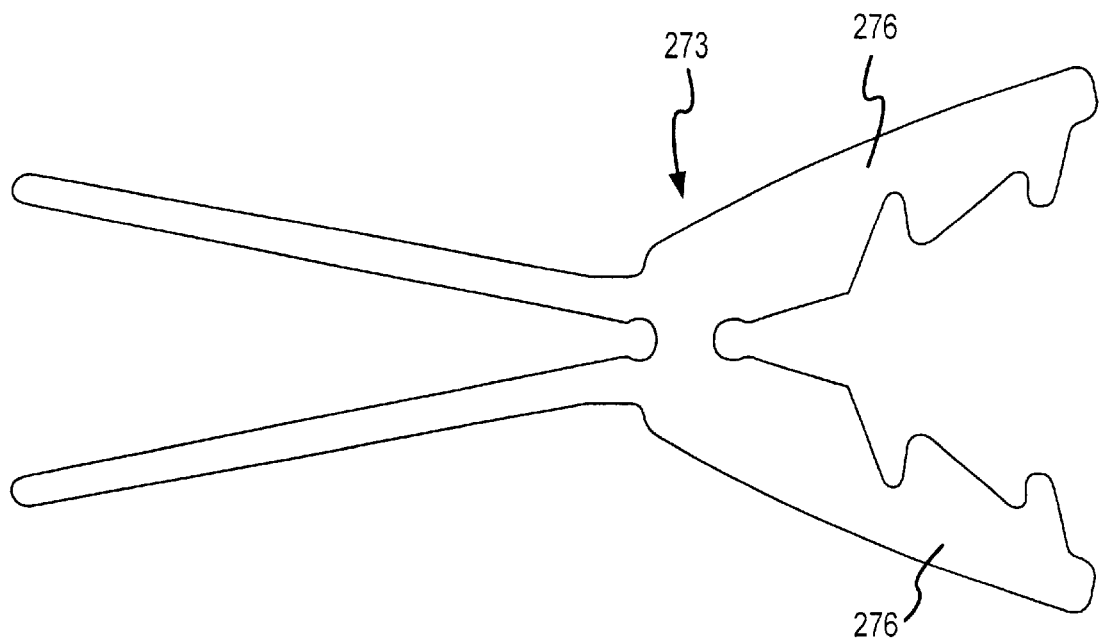
FIG. 28 is a view similar to FIG. 27 with the exception that it is depicted on an enlarged scale.
Figure 29:
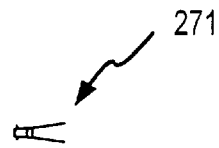
FIG. 29 is a schematic view of a male connector element of the embodiment shown in FIG. 24 depicted in a typical actual size.
Figure 30:
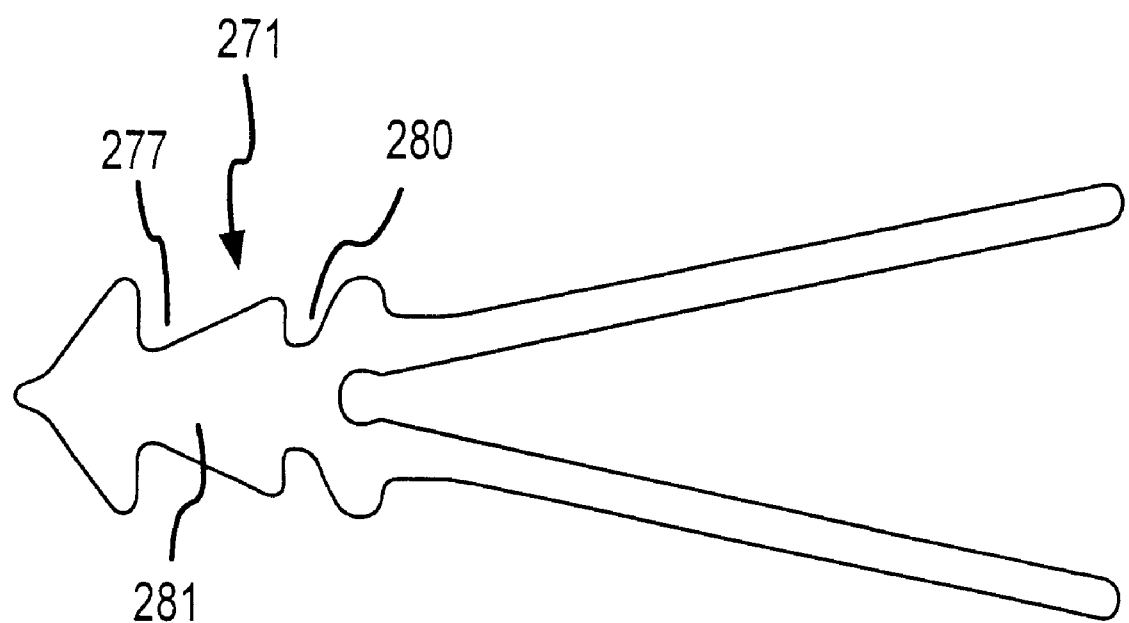
FIG. 30 is a view similar to FIG. 29 with the exception that the male connector element is depicted on an enlarged scale.

Referring now to FIGS. 21, 22 and 23 of the drawings, there is shown a connector assembly 150 somewhat similar to the connector assembly according to the embodiment shown in FIGS. 19 and 20, except for the construction of the slider 255.

In this embodiment, the slider 255 comprising a body 261 having opposed end faces 263*a*, 363*b*. The body 262 incorporates a first duct 264 and a second duct 265. The two ducts 264, 265 are separated at one end of the body 261 by an internal wall structure 266. The two ducts 264, 265 merge towards each other within the body and open onto the opposed end face 263*b* of the body as a common duct. The ducts 264, 265 provide guide paths along which the male and female connector elements 151, 152 are zipped together and unzipped (as the case may be) according to the direction of movement of the slider 255. The interior wall structure 266 incorporates a protuberant portion 267 which is received within the channel portion 187 for the purposes of spreading the jaw sections 185 in order to accept the shank 157 of the male connector element 151. The protuberant portion 267 progressively tapers inwardly in the direction towards merging of the ducts 264, 265 so as to allow the jaw sections 185 to progressively close in order to engulf the shank 157 of the male connector element 151 at the region within the body 261 where the ducts 264, 265 have merged. The jaw sections 185 close owing to the resiliently deformable nature of the female connector element 152.

Referring now to FIGS. 24 to 32, there is shown a connector assembly 270 according to a still further embodiment. The connector means 270 comprises a first connector element in the form a male connector 271 and a second connector element in the form of a female connector element 273.

The profiles of the male and female connector elements 271, 273 differ from previous embodiments because the connector assembly 270 is intended for operations on a small scale. An indication of a typical size for the connector elements can be obtained with reference to FIGS. 27 and 29 of the drawings. Because of the very small size of the male and female connector elements 271, 273, it is necessary to change their profiles to ensure proper engagement therebetween. Nevertheless, the connector elements 271, 273 still have ridges 275 and complementary recesses 277 for inter-engaged. Further, each jaw section 276 of the female connector element 273 still incorporates a tooth formation 279 adapted to engage in a corresponding tooth recess 280 in the head 281 of the male connector element 271. Each tooth formation 279 is an interference fit in its corresponding tooth recess 280 and such inter-engagement permits the jaw sections 276 to pivot inwardly when a separating force is applied between the male and female connector elements. This enhances engagement between the male and female connector elements.

The free end of each jaw section 276 defines a rail 285.

Figure 31:
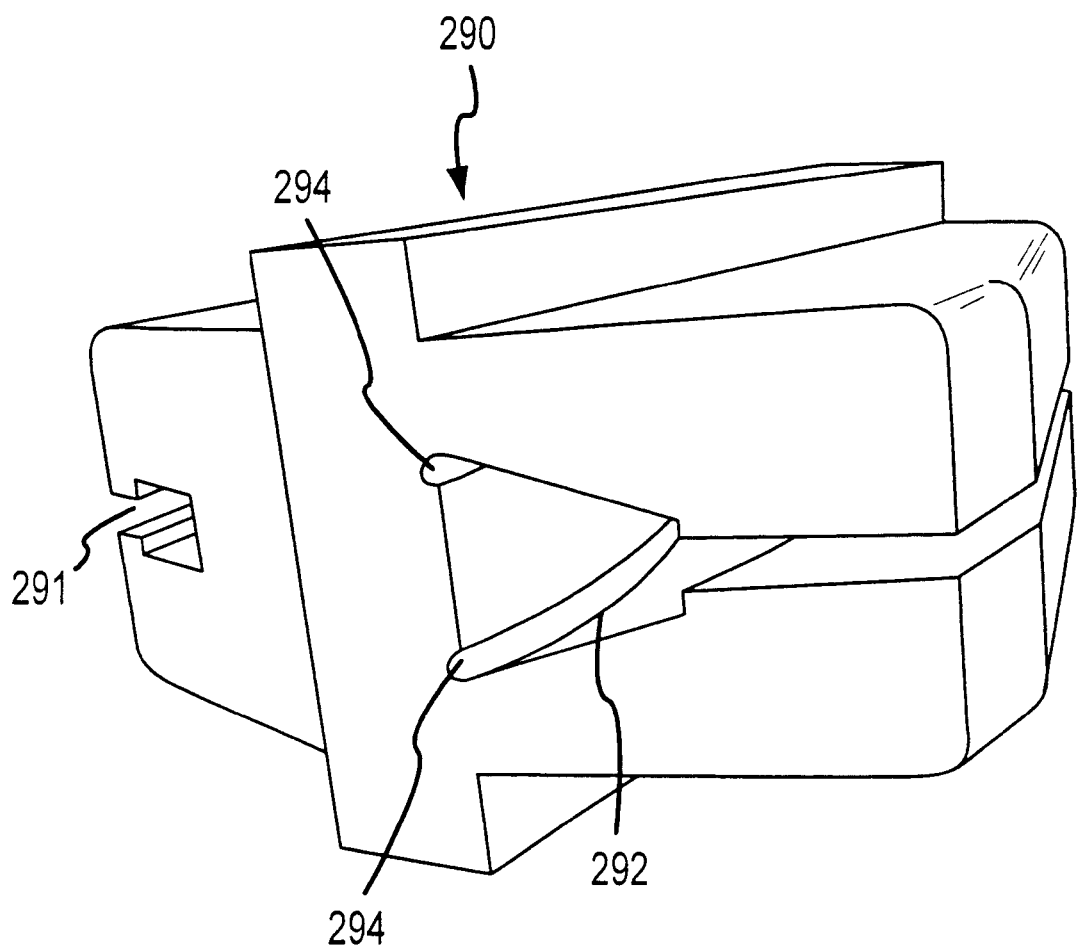
FIG. 31 is a schematic perspective view of a slider for use with a connector assembly according to the embodiment shown in FIG. 24, the slider being viewed from one end thereof.
Figure 32:
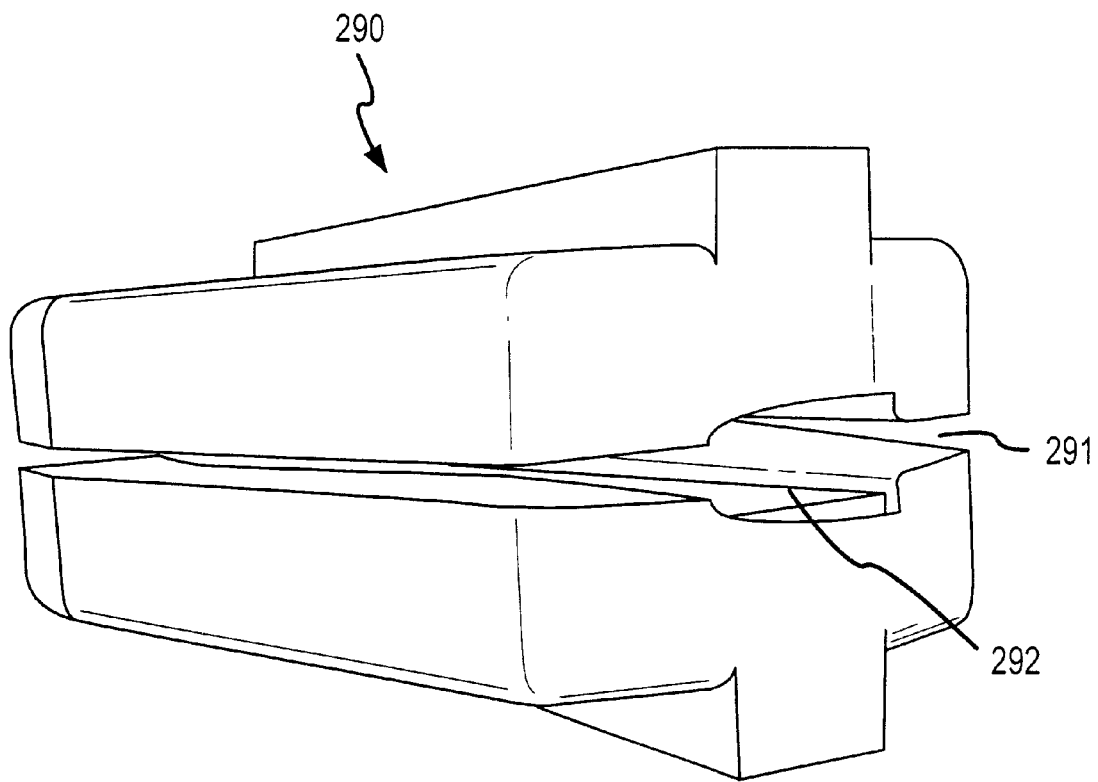
FIG. 32 is a view similar to FIG. 31 with the exception that the slider is viewed from the other end thereof.

FIGS. 31 and 32 illustrate a slider 290 which operates in conjunction with the male and female connector elements 271, 273 to move them together in zipping engagement and to progressively pull them apart in an unzipping action. The slider 290 incorporates two ducts 291, 292. Duct 291 defines a first guide path section which accommodates the male connector element 271 and a second guide path section which accommodates the female connector element 273.

At one end of the slider 290, ducts 291, 292 are spaced apart (as shown in FIG. 31) and the other end of the slider 290 the ducts 291, 292 merge (as shown in FIG. 32).

The duct 292 defining the second guide path section incorporates guide channels 294 which are adapted to receive the rails 285 on the jaw sections 276. The guide channels 294 are arranged to draw the jaw sections 276 apart or together, according to the direction of travel of the slider 290.

Figure 33:
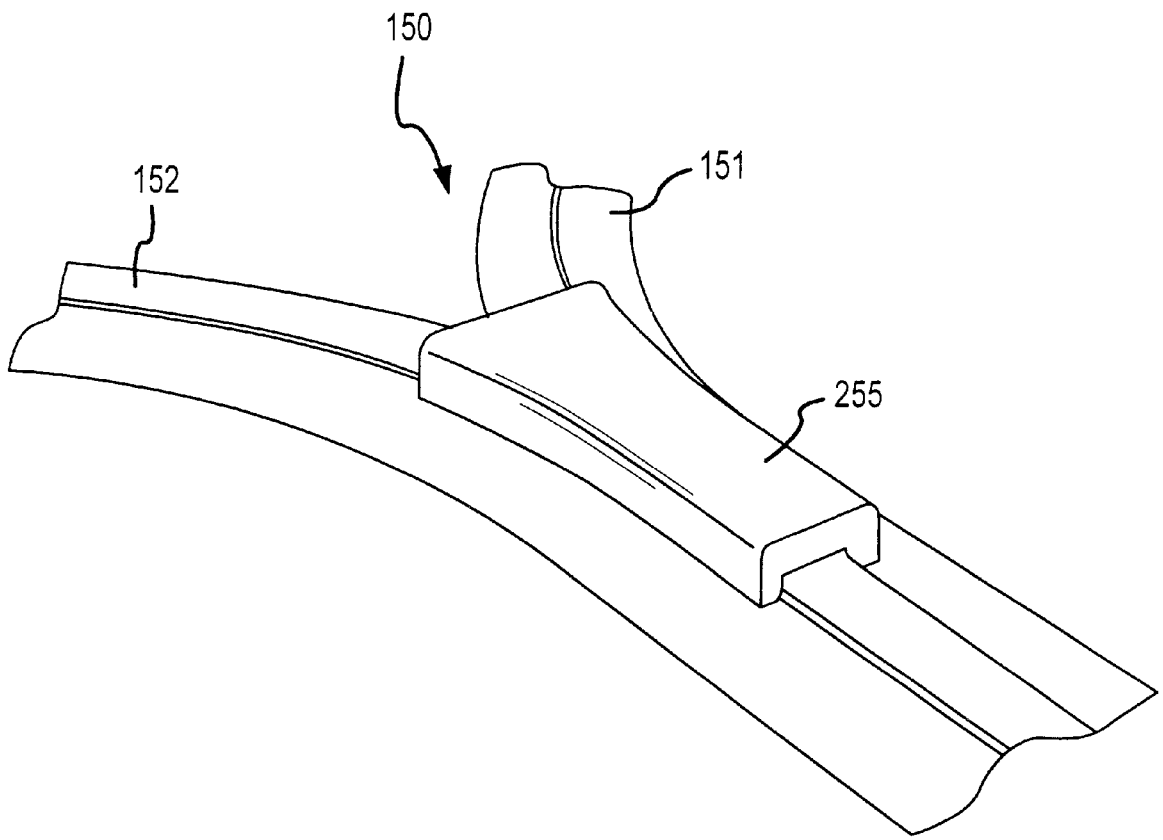
FIG. 33 is a schematic perspective view of a connector assembly according to a still further embodiment.

Referring now to FIG. 33 of the drawings, there is shown a connector assembly 150 similar to the embodiment shown in FIGS. 21, 22 and 23 of the drawings, with the exception that the slider 255 operates only on one side of the male and female connector elements 151, 152.

Figure 34:
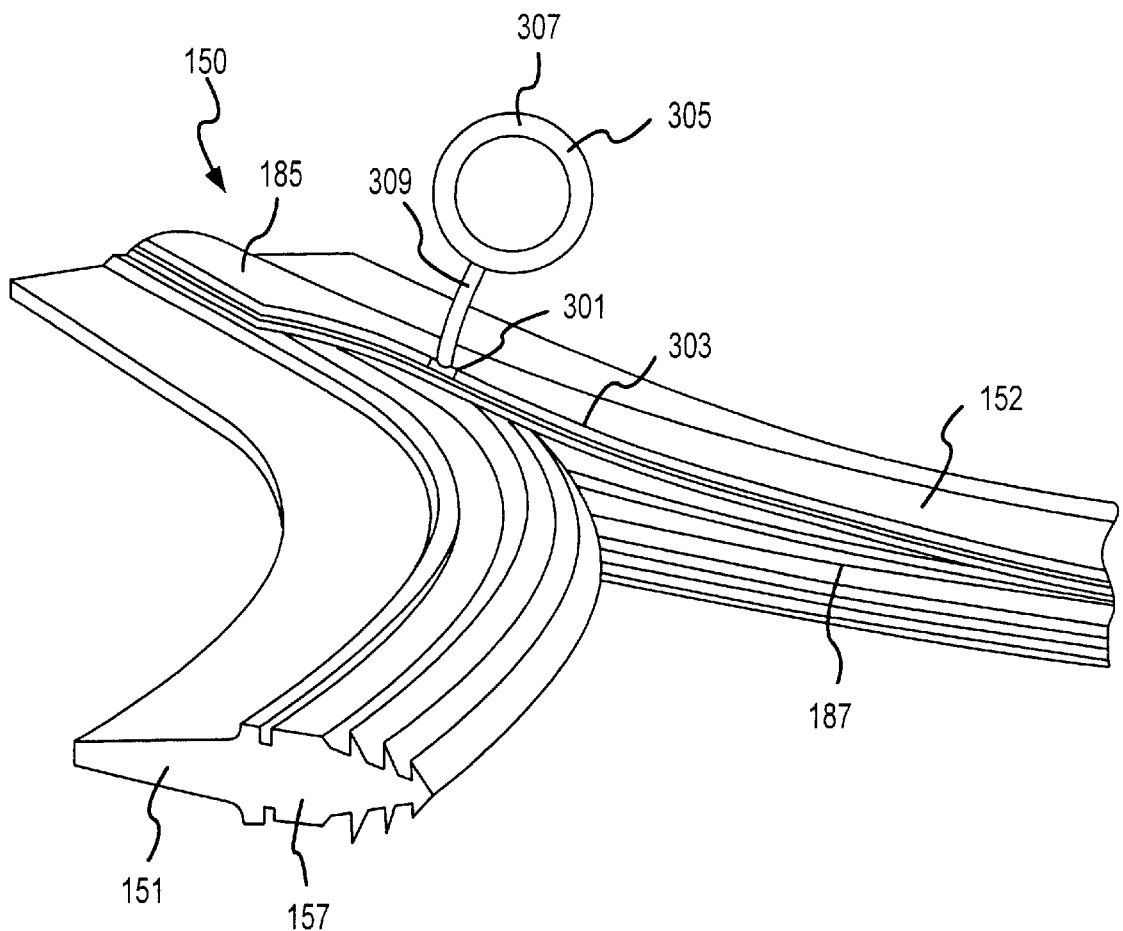
FIG. 34 is a schematic perspective view of a connector assembly according to a still further embodiment.

Referring now to FIG. 34 of the drawings, there is shown a connector assembly 150 according to a still further embodiment, in which the male and female connector elements 151,152 are of similar construction to the corresponding connector elements in the embodiment shown in FIGS. 21, 22 and 23 of the drawings. In this embodiment, there is a slider 301 which travels along a track 303 formed on one of the jaw sections 185 of the female connector element 152. The slider 301 incorporates a grip means 305 in the form of a ring 307 connected to the slider 301 by way of link 309. With this arrangement, a user can insert a finger in the ring 307 and pull the slider 301 along the track 303. As the slider 301 is pulled along the track 303, a sideways force can be applied to the jaw structure 185 so as to deflect it outwardly, as illustrated in the drawings. The outward deflection of the particular jaw structure 185 expands the locking channel 187 in which the shank 157 of the male connector element 151 is received. The expansion of the locking channel 187 allows the male connector element 151 to progressively peel out of the female connector element 152 at the location where the expansion is performed.

Figure 35:
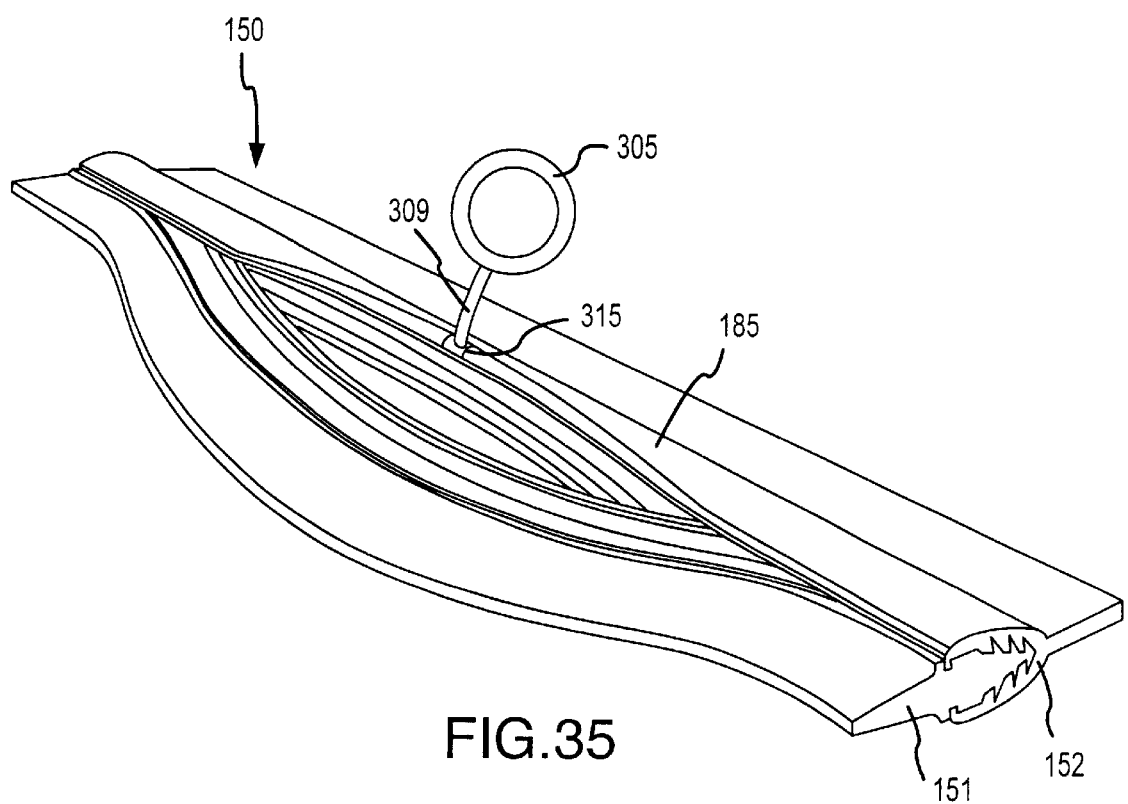
FIG. 35 is a schematic perspective view of a connector assembly according to a still further embodiment.

Referring now to FIG. 35 of the drawings, there is shown a connector assembly 150 which is similar in many respects to the previous embodiment shown in FIG. 34, with the exception that the grip means 305 is rigidly connected by link 309 to a location 315 on one of the jaw structures 185 of the female connector element 151. With this arrangement, the portion of the jaw structure 185 in the region at which the grip means 305 is attached to the jaw structure 185 can be expanded so as to allow the corresponding portion of the male connector element 151 to be removed from interengagement with the female connector element 152, as shown in the drawing. The portion of the male connector element 151 can later be returned into engagement with the corresponding portion of the female connector element 152 by urging the two portions into engagement while expanding the jaw section by pulling on the grip means. Such an arrangement is suitable in circumstances where two edge portions of objects are connected together but there is a need for creating an opening in the two connected objects from time to time. A particular application of such a connector assembly would be in a garment such as a wet suit where it may be necessary to expand a section of the garment to allow fitment onto a user and then subsequently return the garment to the original condition.

Figure 36:
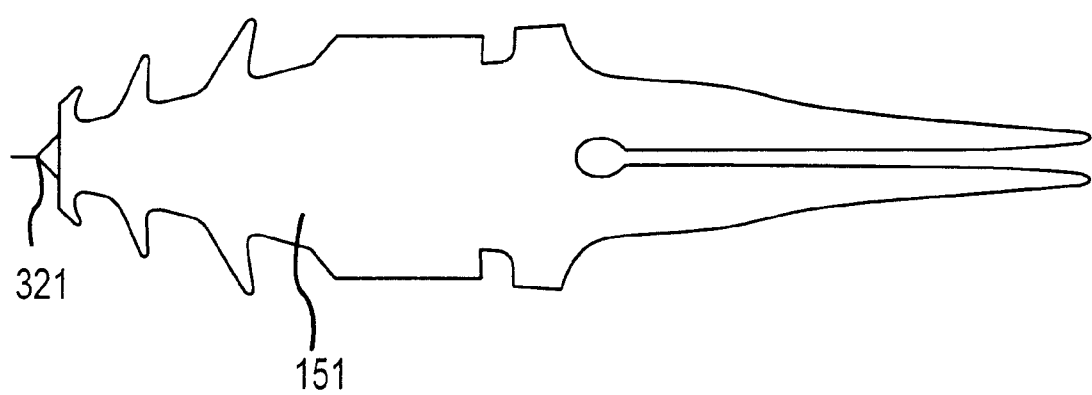
FIG. 36 is a schematic view of a male connector element of a connector assembly according to a still further embodiment.

Referring to FIG. 36 of the drawings, there is shown a male connector element 151 which is somewhat similar to previous embodiments with the exception that the nose 162 which incorporates a nib section 321 which can locate in the slot 211 at the base 190 of the corresponding female connector element 152.

Figure 37:
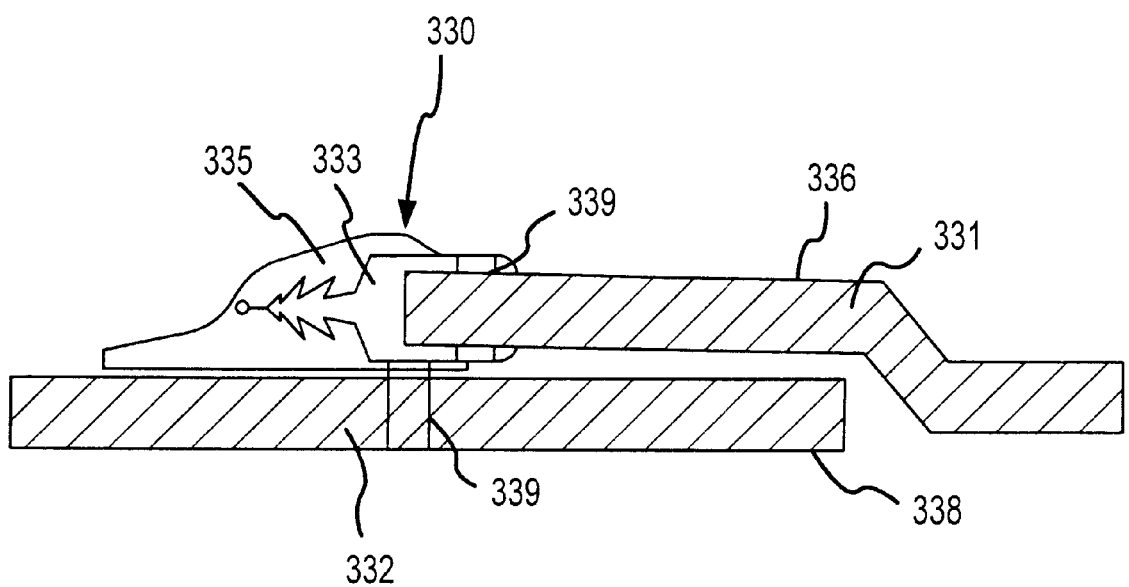
FIG. 37 is a schematic end view of a connector assembly according to a still further embodiment.

Referring now to FIG. 37 of the drawings, there is shown a fastener assembly 330 devised particularly to allow two portions 331, 332 to be connected together in overlapping relationship. The connector assembly 330 comprises a male connector element 333 and a complementary female connector element 335. Each connector element 333, 335 can be secured to its respective portions 331, 332 in any suitable fashion such as by way of stitching 339. A particular advantage of this embodiment is that the connector assembly 330 is located to one side 336 of the two portions 331, 332 positioned in overlapping relationship. In this way, the opposed side 338 of the connector portions 331, 332 are not inhibited by the presence of the connector assembly 330.

Figure 38:
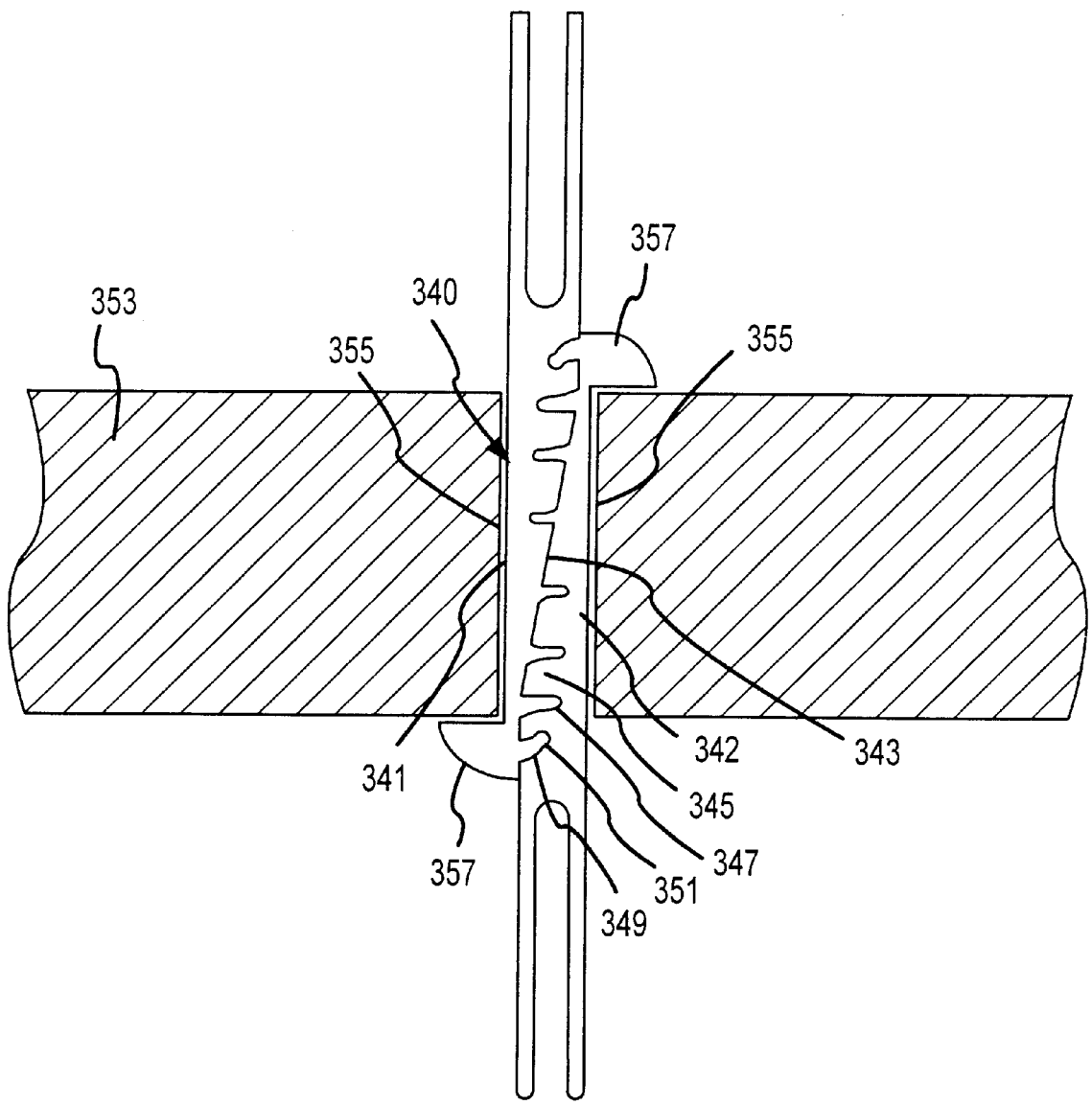
FIG. 38 is a schematic end view of a connector assembly according to a still further embodiment.
Figure 42:
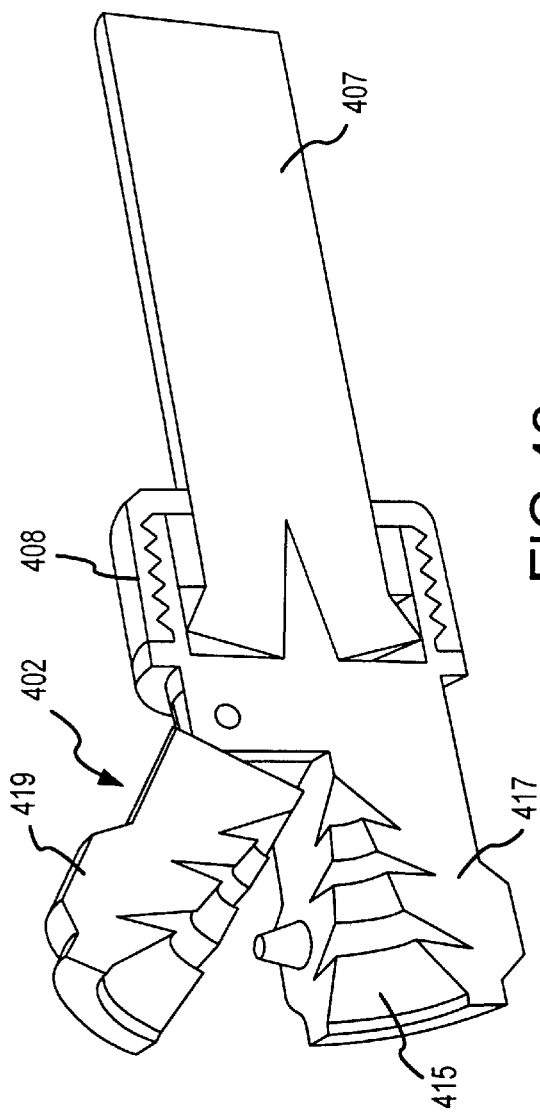
FIG. 42 is a schematic perspective view of a male connector element of a connector assembly according to a still further embodiment.
Figure 43:
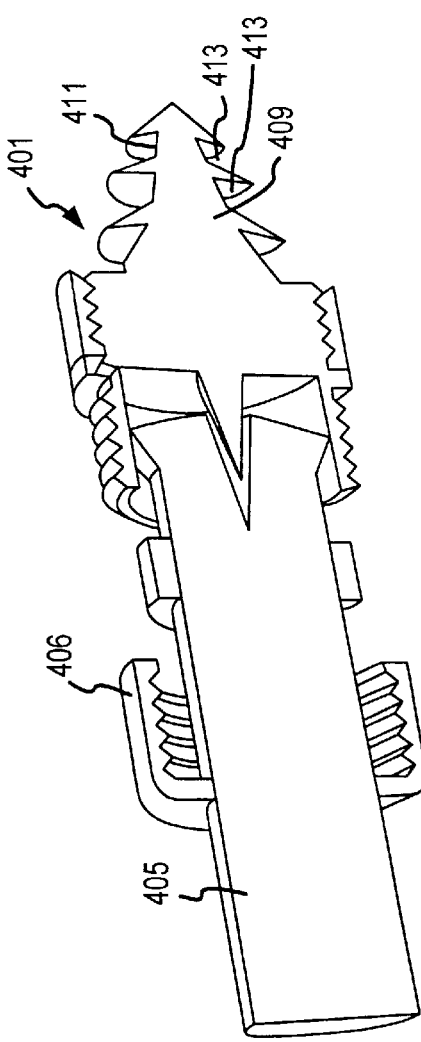
FIG. 43 is a schematic perspective view of a female connector element forming part of the connector assembly.
Figure 44:
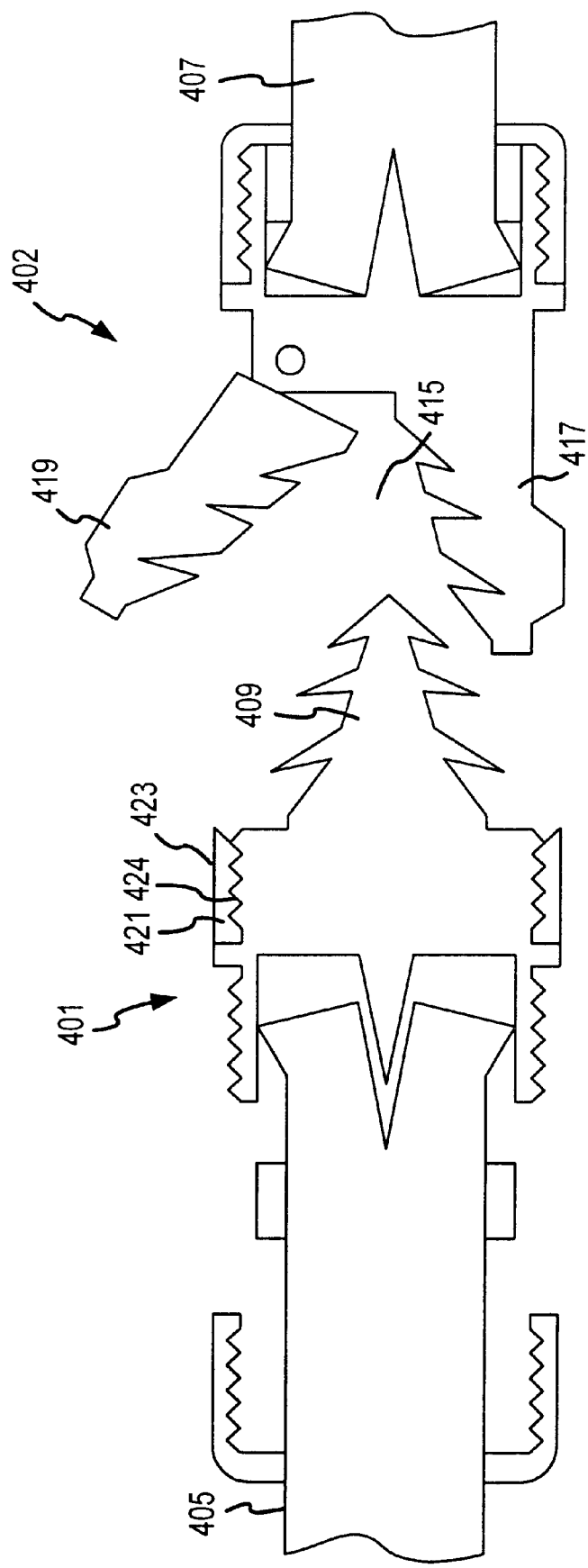
FIG. 44 is a schematic side view of the male and female connector elements about to be connected together.
Figure 45:
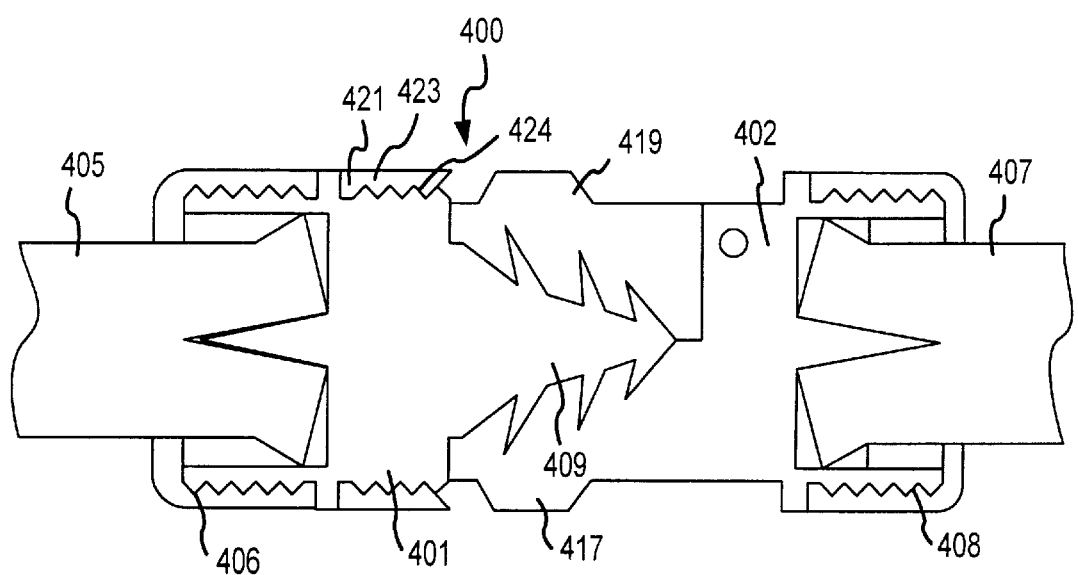
FIG. 45 is a schematic side view of the connector assembly, with the male and female connector elements connected together but with a retaining ring shown in an inoperative position.

Referring now to FIG. 38 of the drawings, there is shown a connector assembly 340 comprising two connector elements 341, 342. In this embodiment, the connector elements 341, 342 are identical in construction, and so there is no male connector element and complementary female connector element. The two connector elements 341, 342 each present a contact face 343, as well as ridges 345 and recesses 347 arranged to interact with each other, as was the case with earlier embodiments. Each connector element 341, 342 also incorporates a tooth formation 349 adapted to be received in a corresponding tooth recess 351 in the other connector element.

The connector assembly 340 according to this embodiment is contained between two side members 353 having faces 355 which bear against the connector elements 341, 342 thereby to prevent lateral separation of the interacting connector members.

The free end of each connector element 341, 342 is provided with an abutment 357 which locates against the respective member 353.

The embodiments described previously have been particularly suitable for connecting longitudinal marginal edge portions together. The invention can, however, also be used for connecting end portions of objects together, such as two ends of elongate elements such as straps, ropes, cables and the like. One such arrangement is disclosed in the embodiment shown in FIGS. 39, 40 and 41.

Referring now to FIGS. 39, 40 and 41, there is provided a connector assembly 360 in the form of a buckle. The buckle 360 has a male connector element 361 connected to one end of a strap 363, and a female connector element 362 connected to one end of a further strap 365. The arrangement is such that the buckle 360 can releasably connect the two straps 363, 365 together.

The female connector element 362 is of somewhat similar construction to previous embodiments in the sense that there is a locking cavity 367 defined between two locking jaws 369, 371. The locking jaw 369 is fixed and locking jaw 371 is pivotally connected to a body 373. With this arrangement, the locking jaw 371 is angularly movable towards and away from locking jaw 369 to contract and expand the locking cavity 367. A spring means (not shown) is provided for biasing the movable locking jaw 371 towards the fixed locking jaw 369 thereby to cause the cavity 367 to assume the contracted condition. The male connector 361 incorporates a locking shank 375 which is receivable in the locking cavity 367 when the movable jaw 371 is pivoted outwardly so as to expand the locking cavity 367. The locking shank 375 can then be engulfed by the locking jaws 369, 371 upon return of the movable jaw 371 to its innermost position.

The buckle 360 also incorporates a supplementary locking means 380 for further securing the locking shank 375 in the locking cavity 367. The locking means 380 comprises a pair of locking pins 381 mounted on one end of a pad 383. The locking pins 381 are slidably supported within the movable jaw 371 for axial movement into and out of the locking cavity 367. The locking pins 381 are movable axially by operation of the pad 383. The locking shank 375 of the male locking element 361 is provided with holes (not shown) for receiving the locking pins 381 when the shank 375 is accommodated within the locking cavity 367 and engulfed by the jaw sections 369, 371. Reception of the locking pins 381 in the holes (not shown) within the locking shank 375 further secures the male connector element 361 to the female connector element 362. A particular feature of the arrangement is that the locking pins 381 can be withdrawn from the corresponding holes (not shown) within the male shank 375 by pulling on the pad 383. Continued pulling of the pad 383 also serves to cause the movable jaw 371 to pivot away from the fixed jaw 369 and thereby expand the locking cavity 367 so as to permit removal of the locking shank 375.

Referring now to FIGS. 42 to 46, there is shown a connector assembly 400 for connecting two elongate elements 405, 407 such as ropes together in end-to-end relationship. The connector assembly 400 comprises a male connector element 401 fitted onto one end of rope 405 by coupling 406, and a female connector element 402 fitted onto one end of rope 407 by coupling 408.

The male connector element 401 includes a locking shank 409 which presents a circumferential contact face 411. Circumferential recesses 413 are provided at spaced locations axially along the shank 409.

The female connector element 402 comprises a locking cavity 415 adapted to receive the locking shank 409 of the male connector element 401. The locking cavity 415 is defined between a fixed jaw 417 and a movable jaw 419 pivotally mounted with respect to the fixed jaw for expanding and contracting the locking cavity 415.

Figure 46:
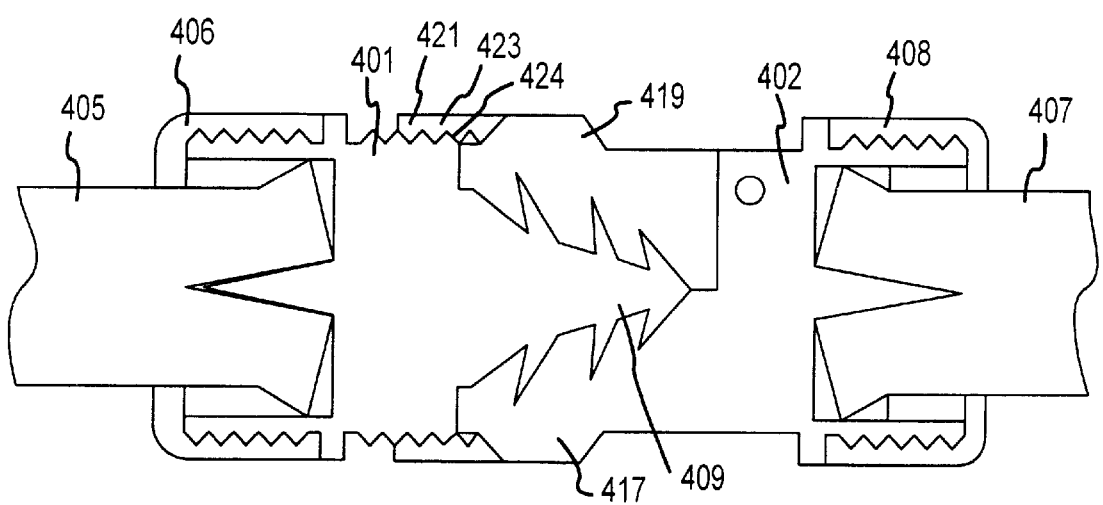
FIG. 46 is a view similar to FIG. 45 with the exception that the retaining ring is shown in an operative position.

A retaining means 421 is provided for releasably retaining the jaws 417, 419 in a closed condition for retaining the shank 409 within the locking cavity 415. The retaining means 421 comprises a retaining ring 423 threadably mounted 424 onto the body of the male connector element 401. With this arrangement, the locating ring can be moved axially by rotation thereof upon the body between operative and inoperative conditions respectively in and out of engagement with the clamping jaws. When in engagement with the clamping jaws, the retaining ring 423 surrounds the clamping jaws 417, 419 (as shown in FIG. 46) thereby to prevent pivotal movement of the movable jaw away from the fixed jaw. The retaining ring 423 is shown in a position clear of the jaws 417, 419 to permit opening thereof in FIG. 45.

Figure 47:
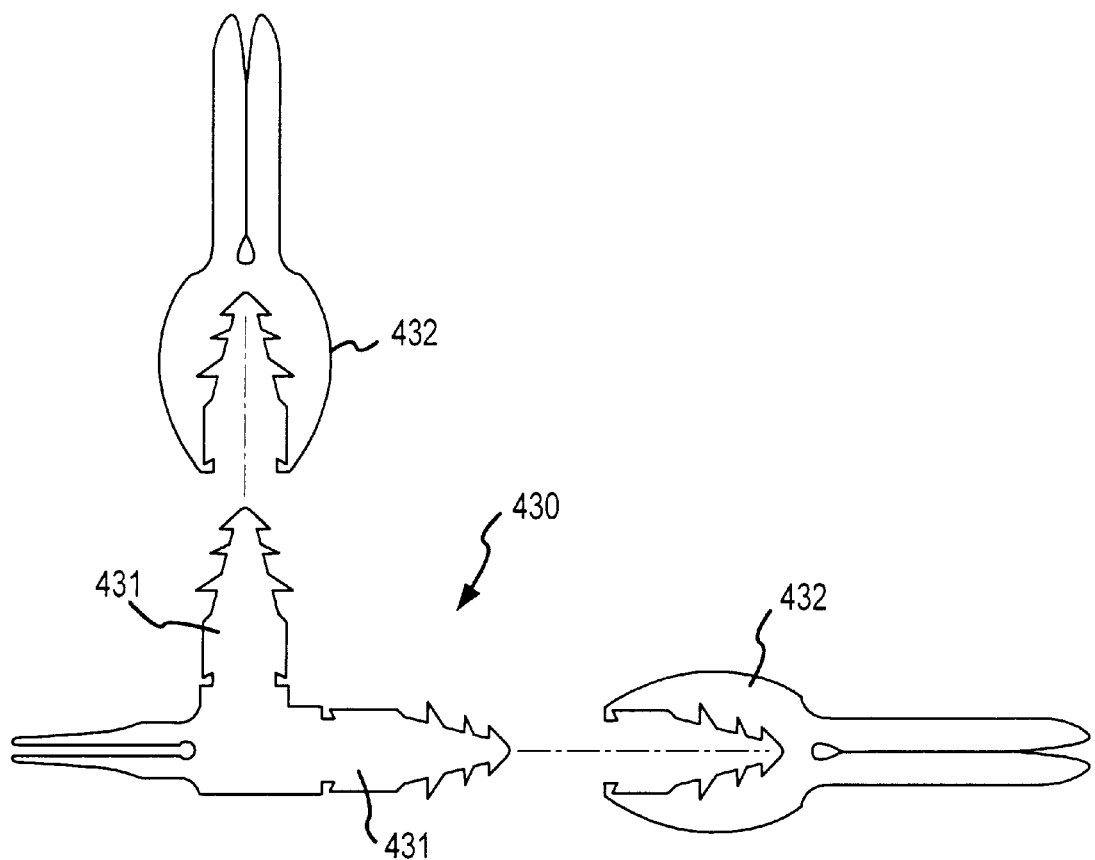
FIG. 47 is a view of a connector assembly for constructing a T-junction.

Referring now to FIG. 47 of the drawings, there is shown a connector assembly 430 comprising two male connector elements 431 formed integrally with each other and disposed angularly one with respect to the other. In this embodiment, the two male connector elements are disposed at right angles in respect to each other. The connector assembly 430 further comprises two female connector elements 432, each adapted to interact with one of the male connector elements 431.

As previously mentioned, the connector assemblies according to at least some of the embodiments can provide a fluid type seal. There may be situations where the seal may possibly be vulnerable to leakage at the end of the zipper, particularly at the location of the slider. It may therefore be desirable to further enhance the sealing properties of the connector assembly at the ends thereof, such as in cases where a vacuum effect is applied to one side of the connector assembly. In such circumstances, it may be desirable to supplement the seal at the ends of the connector assembly by a supplementary seal mechanism such as a sealing pocket which can accommodate the slider in a sealed environment.

Modifications and variations such as would be apparent to the skilled addressee are considered to fall within the scope of the present invention.

Throughout the specification, unless the context requires otherwise, the word "comprise" or variations such as "comprises" or "comprising", will be understood to imply the inclusion of a stated integer or group of integers but not the exclusion of any other integer or group of integers.

The claims defining the invention are as follows:

1. A connector assembly comprising a male connector element having a locking shank and a female connector element having a locking cavity with an external opening, the locking shank is receivable in the locking cavity through the external opening, the male connector element presents a male contact face and the female connector element presents a female contact face, the male and female connector elements being configured for interaction therebetween with the contact faces in abutting engagement when the locking shank is received in the locking cavity to resist a separating force applied between the male and female connector elements the interaction between the male and female connector elements is provided at spaced apart locations lengthwise along the shank, wherein one of the connector elements has a first engagement means for engagement with a second engagement means on the other connector element whereby the application of the separating force between the two connector elements urges one of the two contact faces towards the other contact face thereby to enhance interaction between the connector elements and wherein the first and second engagement means are adapted to provide pivotal engagement between the connector elements.

2. A connector assembly according to claim 1 wherein the interaction between the male and female connector elements is provided by a series of complementary ridges and recesses at spaced intervals along the contact faces.

3. A connector assembly according to claim 2 wherein the ridges are provided on the female connector element and the complementary recesses are provided in the male connector element.

4. A connector assembly according to claim 2 wherein the recesses are separated by a plurality of spaced locking ribs projecting from the respective contact face.

5. A connector assembly according to claim 4 wherein each locking rib presents a locking face facing away from the free end of the shank and disposed at an acute angle with respect to the contact face.

6. A connector assembly according to claim 4 wherein the ridges are separated by locking grooves of complementary configuration to the locking ribs.

7. A connector assembly according to claim 1 wherein one of the connector elements has a first engagement means for engagement with a second engagement means on the other connector element whereby the application of the separating force between the two connector elements urges one of the two contact faces towards the other contact face thereby to enhance interaction between the connector elements.

8. A connector assembly according to claim 1 wherein the first engagement means comprises a tooth formation and the second engagement means comprises a tooth recess configured to pivotally receive the tooth formation.

9. A connector assembly according to claim 1 wherein the locking cavity within the female connector element comprises a locking channel and two contact faces, one disposed on each longitudinal side of the channel.

10. A connector assembly according to claim 9 wherein the complementary locking shank presenting two contact faces, one each longitudinal side of the elongate shank.

11. A connector assembly according to claim 1 wherein the male connector comprises a spigot presenting an outer circumferential contact face and the female connector element comprises a socket for receiving the spigot and presenting an inner circumferential contact face.

12. A connector assembly according to claim 1 wherein the locking cavity is adapted to expand to receive the locking shank and to contract upon the locking shank received therein.

13. A connector assembly according to claim 12 wherein the locking cavity is defined between two jaw sections movable relative to each other for expanding and contracting the locking cavity.

14. A connector assembly according to claim 13 wherein the jaw sections are biased towards a closed condition corresponding to contraction of the cavity.

15. A connector assembly according to claim 14 wherein the female connector element are formed of resiliently deformable material whereby the jaw sections are biased towards the closed condition by virtue of the resiliently deformable nature of the female connector element.

16. A connector assembly according to claim 14 wherein the jaw sections are pivotally connected with respect to each other and a retaining means provided for retaining the jaws in the closed condition.

17. A connector assembly according to claim 1 further comprising a slider for moving the connector elements into and out of interaction with each other.

18. A connector assembly comprising a male connector element having a locking shank and a female connector element having a locking cavity with an external opening, the locking shank is receivable in the locking cavity through the external opening, the male connector element presents a male contact face and the female connector element presents a female contact face, the male and female connector elements being configured for interaction therebetween with the contact faces in abutting engagement when the locking shank is received in the locking cavity to resist a separating force applied between the male and female connector elements the interaction between the male and female connector elements is provided at spaced apart locations lengthwise along the shank, wherein the locking cavity is adapted to expand to receive the locking shank and to contract upon the locking shank received therein, wherein the locking cavity is defined between two jaw sections movable relative to each other for expanding and contracting the locking cavity and wherein the jaw sections are biased towards a closed condition corresponding to contraction of the cavity.

19. A connector assembly comprising a male connector element having a locking shank and a female connector element having a locking cavity with an external opening, the locking shank is receivable in the locking cavity through the external opening, the male connector element presents a male contact face and the female connector element presents a female contact face, the male and female connector elements being configured for interaction therebetween with the contact faces in abutting engagement when the locking shank is received in the locking cavity to resist a separating force applied between the male and female connector elements the interaction between the male and female connector elements is provided at spaced apart locations lengthwise along the shank, and further comprising a slider for moving the connector elements into and out of interaction with each other, wherein the slider is provided with means for progressively expanding the locking channel as the slider moves with respect to the female connector element to facilitate admission of the shank of the male connector element into the locking channel.

20. A connector assembly according to claim 19 wherein the first engagement means comprises a tooth formation and the second engagement means comprises a tooth recess configured to pivotally receive the tooth formation.

21. A connector assembly according to claim 19 wherein the contact faces each have at least a section thereof disposed obliquely with respect to the line of action of the separating force.

22. A connector assembly according to claim 21 wherein each connector element has only a first engagement means or a second engagement means.

23. A connector assembly according to claim 21 wherein each connector element has both first and second engagement means.

24. A connector assembly according to claim 19 wherein one of the connector elements comprises a male connector element and the other connector element comprises a complementary female connector element.

25. A connector assembly according to claim 19 wherein the first and second connector elements further comprise complementary longitudinal ridges and recesses provided thereon and arranged such that force applied to pull same apart acts to strengthen the grip of the second connector element about the first connector element.

26. A connector assembly for releasably connecting together two elongate edge sections, the connector means comprising first and second connector elements of complementary configuration, said first connector element being adapted for attachment to one of the two elongate edge sections and having an opening in opposed relation to said one of the two elongate edge sections, a channel portion having a pair of opposed sides in spaced apart relationship and extending inwardly from said opening to define a locking cavity, the opposed sides having opposed inner faces confronting the locking cavity, containing a first engaging means and converging towards the other of the opposed sides in a direction away from the opening, said second connector element being adapted for attachment to the other of the two elongate edge sections and including a head portion adapted to be received in the locking cavity of the channel portion of the first connector element, the head portion having opposed side faces converging towards each other in a direction away from the other elongate edge section, each face being provided with a second engaging means, whereby the second engaging means engages with the first engaging means when the head portion is received within the cavity and releasable secures the second connector element to the first connector element, whereby such may be pressed together and force applied to pull such apart acts to strengthen the group therebetween, with the connector elements requiring an unpeeling or unzipping action to separate same.

27. A connector assembly for releasably connecting together two elongate edge sections, the connector means comprising first and second elongate connector elements of complementary configuration, said first connector element being adapted for attachment to one of the two elongate edge sections and having two jaw sections defining an opening in opposed relation to said one of the two elongate edge sections and a channel portion having a pair of opposed sides in spaced apart relationship and extending inwardly from said opening to define a locking cavity, the opposed sides having opposed inner faces confronting the locking cavity, containing a first engaging means and converging towards the other of the opposed sides in a direction away from the opening, said second connector element being adapted for attachment to the other of the two elongate edge sections and including a head portion adapted to be received in the locking cavity of the channel portion of the first connector element, the head portion having opposed side faces converging towards each other in a direction away from the other elongate edge section, each face being provided with a second engaging means, the free end of each jaw section being adapted to pivotally engage with the head portion when the latter is received in the locking cavity the second engaging means engaging with the first engaging means when the head portion is received within the locking cavity and releasable secures the second connector element to the first connector element, whereby such may be progressively pressed together along the length thereof and force applied to pull such apart acts to strengthen the group therebetween, with the connector elements requiring an unpeeling or unzipping action to separate same.

28. A connector assembly according to claim 27 wherein a formation is provided adjacent the free end of each jaw section for engaging with a complementary formation on the head to provide said pivotal engagement between the jaw section and the head.

29. A connector assembly according to claim 28 wherein the formation on the jaw section comprises a tooth formation and the complementary formation on the head comprises a recess to receive the tooth formation.

30. A connector assembly according to claim 27 wherein inter-engagement between each tooth formation and the corresponding tooth recess provides a pivot about which the respective jaw sections can pivot under the influence of a separating force applied to the connector elements so as to urge the jaw sections inwardly.

31. A connector assembly for releasably connecting together two elongate edge sections, the connector means comprising first and second connector elements of complementary configuration, said first connector element being adapted for attachment to one of the longitudinal edges and the second connector element being adapted for attachment to the other of the longitudinal edges, the first connector element comprising a body having two jaw sections defining an opening in opposed relation to said one longitudinal edge and a channel portion extending inwardly from said opening to define a locking cavity, the channel portion having a pair of opposed sides in spaced apart relationship, the opposed sides having opposed inner faces confronting the locking cavity, each opposed side containing a first engaging means and converging towards the other of the opposed sides in a direction away from the opening to terminate at one end of a slit extending into the body in the direction away from the opening, a hinge being provided at the other end of the slot to facilitate movement of the two jaw sections towards and away from each other, said second connector element comprising a head portion adapted to be received in the locking cavity of the channel portion of the first connector element, the head portion having opposed side faces converging towards each in a direction away from the other longitudinal edge, each face being provided with a second engaging means, whereby the second engaging means engages with the first engaging means when the head portion is received within the recess and releasably secures the second connector element to the first connector element, whereby such may be pressed together and force applied to pull such apart acts to strengthen the grip therebetween, with the connector elements requiring an unpeeling or unzipping action to separate same.

32. A connector assembly according to claim 31 wherein the slot terminates at a hole.

33. A connector assembly comprising a male connector element having a locking shank and a female connector element having a locking cavity with an external opening, the locking shank is receivable in the locking cavity through the external opening, the male connector element presents a male contact face and the female connector element presents a female contact face, the male and female connector elements being configured for interaction therebetween with the contact faces in abutting engagement when the locking shank is received in the locking cavity to resist a separating force applied between the male and female connector elements, the interaction between the male and female connector elements being provided at spaced apart locations lengthwise along the shank by a series of complementary ridges and recesses at spaced intervals along the contact faces, wherein the contact faces each have at least a section thereof disposed obliquely with respect to the line of action of the separating force.

34. A connector assembly comprising two connector elements each having a contact face adapted for abutting engagement with the contact face of the other, the connector elements being configured for interaction therebetween when the contact faces are in abutting engagement to resist a separating force applied between the two connector elements, one of the connector elements having a first engagement means for engagement with a second engagement means on the other connector element, wherein the application of a separating force between the two connector elements urges one of the two contact faces towards the other contact face to enhance interaction between the connector elements, and wherein the contact faces each have at least a section thereof disposed obliquely with respect to the line of action of the separating force.

* * * * *